United States Patent
Koide et al.

(10) Patent No.: US 9,288,221 B2
(45) Date of Patent: Mar. 15, 2016

(54) INFORMATION PROCESSING APPARATUS, METHOD FOR DETERMINING UNAUTHORIZED ACTIVITY AND COMPUTER-READABLE MEDIUM

(71) Applicant: PFU LIMITED, Kahoku-shi, Ishikawa (JP)

(72) Inventors: Kazuhiro Koide, Kahoku (JP); Keiji Michine, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 42 days.

(21) Appl. No.: 14/254,928

(22) Filed: Apr. 17, 2014

(65) Prior Publication Data

US 2015/0200956 A1    Jul. 16, 2015

(30) Foreign Application Priority Data

Jan. 14, 2014    (JP) ................. 2014-004055

(51) Int. Cl.
*H04L 29/06* (2006.01)
*H04L 12/26* (2006.01)

(52) U.S. Cl.
CPC ............ *H04L 63/1408* (2013.01); *H04L 43/04* (2013.01)

(58) Field of Classification Search
CPC . G06F 21/00; H04L 63/1408; H04L 63/1416; H04L 63/1425
See application file for complete search history.

(56) References Cited

U.S. PATENT DOCUMENTS

| | | |
|---|---|---|
| 7,185,368 B2 | 2/2007 | Copeland, III |
| 7,475,426 B2 | 1/2009 | Copeland, III |
| 2006/0117386 A1* | 6/2006 | Gupta et al. ............... 726/23 |
| 2009/0172815 A1 | 7/2009 | Gu et al. |

FOREIGN PATENT DOCUMENTS

JP    2006-350543 A    12/2006

* cited by examiner

*Primary Examiner* — Izunna Okeke
(74) *Attorney, Agent, or Firm* — Westerman, Hattori, Daniels & Adrian, LLP

(57) ABSTRACT

An information processing apparatus is provided with: a comparison unit that compares a communication by a terminal connected to a network with a pattern held in advance; a specification unit that specifies an evaluation value indicating an extent to which it is inferred that the terminal is used to conduct unauthorized activity, and a phase of unauthorized activity, in accordance with a comparison result; a holding unit that holds a maximum value of the evaluation value, for each phase, and for each terminal; and a determination unit that determines whether or not the terminal is used to conduct unauthorized activity, based on the maximum value of the evaluation value for each of the phases.

14 Claims, 15 Drawing Sheets

INFORMATION PROCESSING APPARATUS, METHOD FOR DETERMINING UNAUTHORIZED ACTIVITY AND COMPUTER-READABLE MEDIUM

CROSS-REFERENCE TO RELATED APPLICATION

This application is based upon and claims the benefit of priority of the prior Japanese Patent Application No. JP2014-004055, filed on Jan. 14, 2014, the entire contents of which are incorporated herein by reference.

FIELD

The present disclosure relates to technology for managing terminals connected to the network.

BACKGROUND

In the prior art, as a traffic analyzing method, a method has been proposed in which concern index values are assigned to flows between hosts on a network, and an alarm is issued if the accumulated concern index values exceed a threshold value (see U.S. Pat. No. 7,475,426 and U.S. Pat. No. 7,185,368).

SUMMARY

One example of the present disclosure is an information processing apparatus, including: a comparison unit that compares a communication by a terminal connected to a network with a pattern held in advance; a specification unit that specifies an evaluation value indicating an extent to which it is inferred that the terminal is used to conduct unauthorized activity, and a phase of unauthorized activity, in accordance with a result of comparison by the comparison unit; a holding unit that holds a maximum value of the evaluation value, for each phase, and for each terminal; and a determination unit that determines whether or not the terminal is used to conduct unauthorized activity, based on the maximum value of the evaluation value for each of the phases.

The present disclosure can be understood as an information processing apparatus, a system, a method executed by a computer, or a program which is executed in a computer.

Furthermore, the present disclosure can also be understood as a recording medium on which such a program is recorded so as to be readably by a computer, or other apparatus or machine, or the like.

Here, a recording medium which is readable by a computer, or the like, is a recording medium on which information, such as data or programs, is stored by an electrical, magnetic, optical, mechanical or chemical action, and which can be read by the computer, or the like.

DESCRIPTION OF EMBODIMENTS

Below, embodiments of the information processing apparatus and the method and program relating to the present disclosure are described below based on the drawings.

However, the embodiments given below are merely examples and the information processing apparatus and the method and program relating to the present disclosure are not limited to the specific configuration given below. In implementing the disclosure, the configurations corresponding to the embodiments can be adopted, as appropriate, and various improvements and modifications can be made.

In the present embodiment, the information processing apparatus, method and program relating to the present disclosure are described based on an embodiment implemented in a system in which a terminal carrying out an unauthorized activity on a network is discovered and measures such as blocking communication or issuing an alert, etc. are implemented. The information processing apparatus, method and program relating to the present disclosure can be applied widely to technology for detecting unauthorized activity on a network, and the object of application of the disclosure is not limited to the example given in the present embodiment.

<System Configuration>

Figure 1:
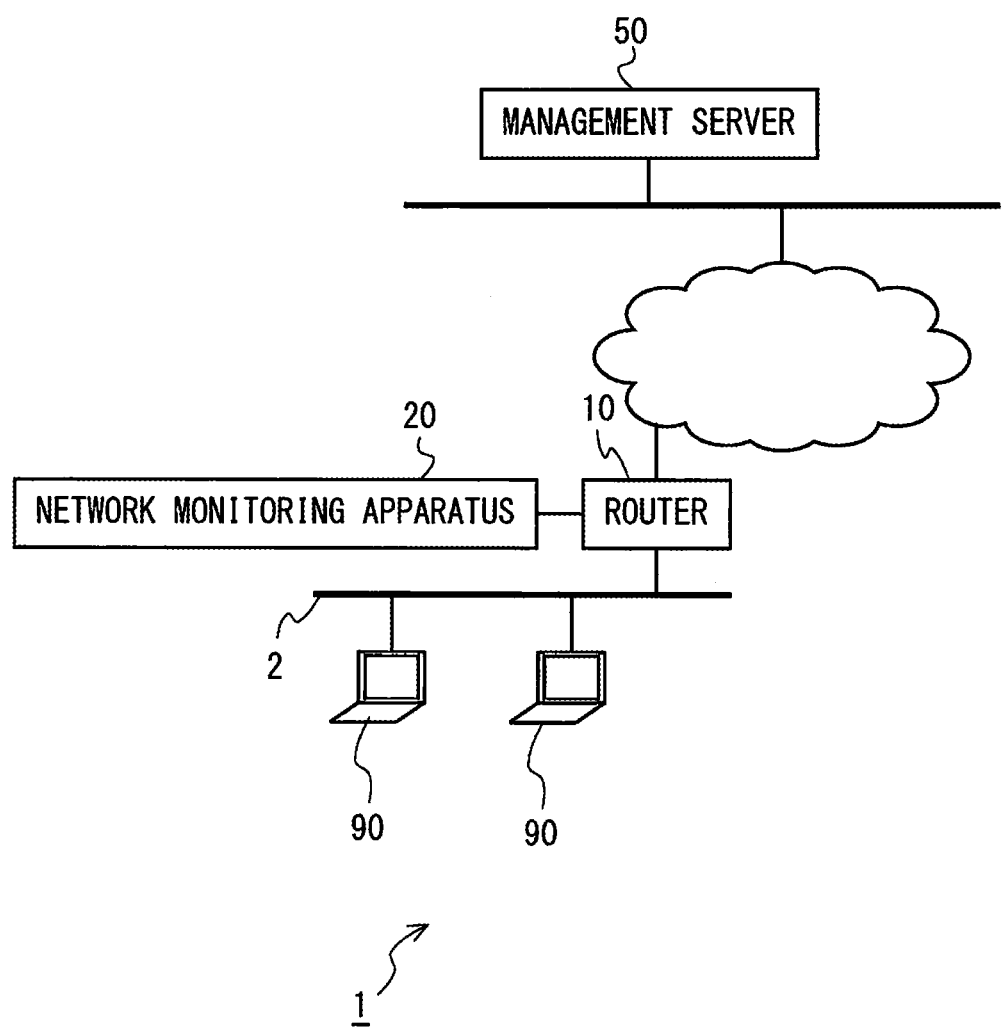
FIG. 1 is a schematic drawing showing a configuration of a system relating to an embodiment of the disclosure.

FIG. 1 is a schematic drawing showing the configuration of a system 1 relating to the present embodiment. The system 1 relating to the present embodiment includes a network segment 2 to which a plurality of information processing terminals 90 (called "nodes 90" below) are connected, and a network monitoring apparatus 20 for monitoring communication relating to the nodes 90. Furthermore, the management server 50 is connected so as to be able to communicate with the network segment 2 via a router 10. In the present embodiment, the network monitoring apparatus 20 acquires packets, and frames, etc. sent and received by the nodes 90, by connecting with a monitoring port (mirror port) of the switch or router (the router in the example shown in FIG. 1). In this case, the network monitoring apparatus 20 operates in a passive mode and does not transfer the acquired packets.

The management server 50 gathers information from the network monitoring apparatus 20 and manages the network monitoring apparatus 20. A quarantine server may also be provided in the external network, and a quarantine service may be provided to the nodes 90 connected to the network segment 2, and a business server may also be provided and a service for business may be provided to the nodes 90 (not illustrated in the drawings).

In the system 1 relating to the present embodiment, the various servers connected from the nodes 90 are connected remotely via the Internet or a wide-area network, for example, the servers are presented by an application service provider (ASP), but these servers do not necessarily have to be connected remotely. For example, the servers may also be connected to a local network in which the nodes 90 and the network monitoring apparatus 20 are situated.

Figure 2:
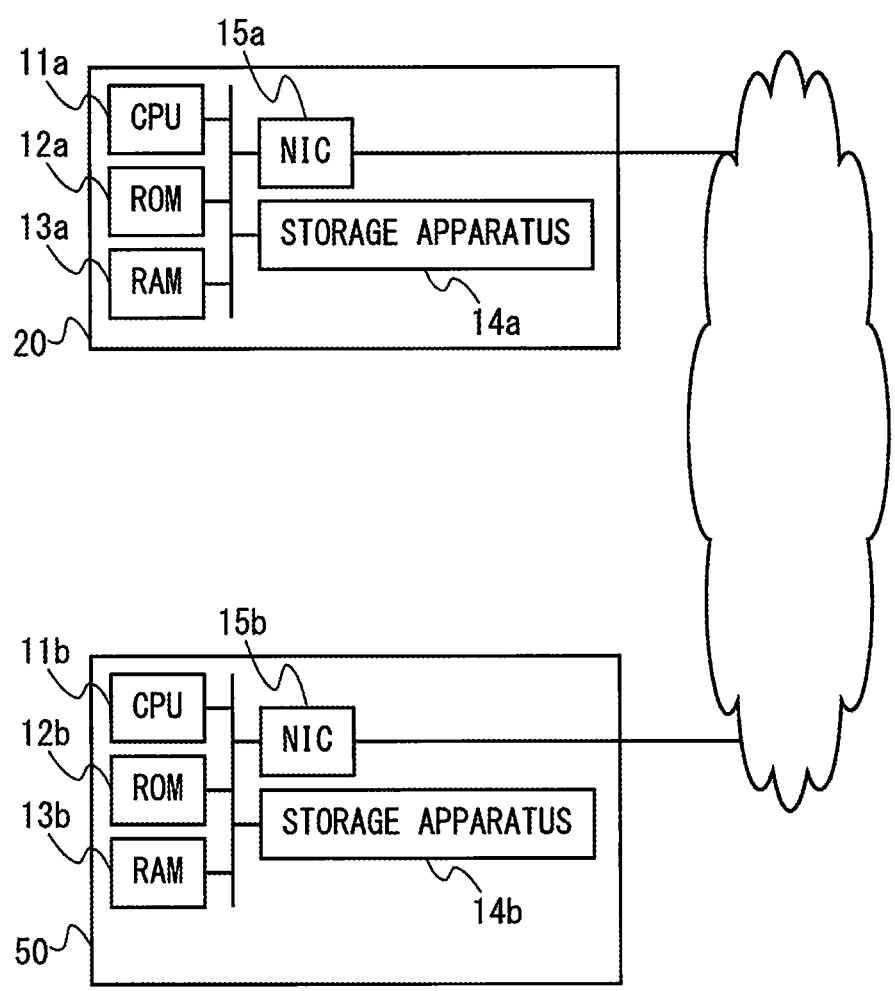
FIG. 2 is a diagram showing a hardware configuration of a network monitoring apparatus and a management server relating to the embodiment.

FIG. 2 is a diagram showing a hardware configuration of a network monitoring apparatus 20 and a management server 50 relating to the present embodiment. In FIG. 2, the configuration apart from the network monitoring apparatus 20 and the management server 50 (namely, the router 10, nodes 90, etc.) is not illustrated. The network monitoring apparatus 20 and the management server 50 are, respectively, computers including a central processing unit (CPU) 11a, 11b, a random access memory (RAM) 13a, 13b, a read only memory (ROM) 12a, 12b, a storage apparatus 14a, 14b, such as an electrically erasable and programmable read only memory (EEPROM) or a hard disk drive (HDD), a communication unit such as a network interface card (NIC) 15a, 15b, and the like.

Figure 3:
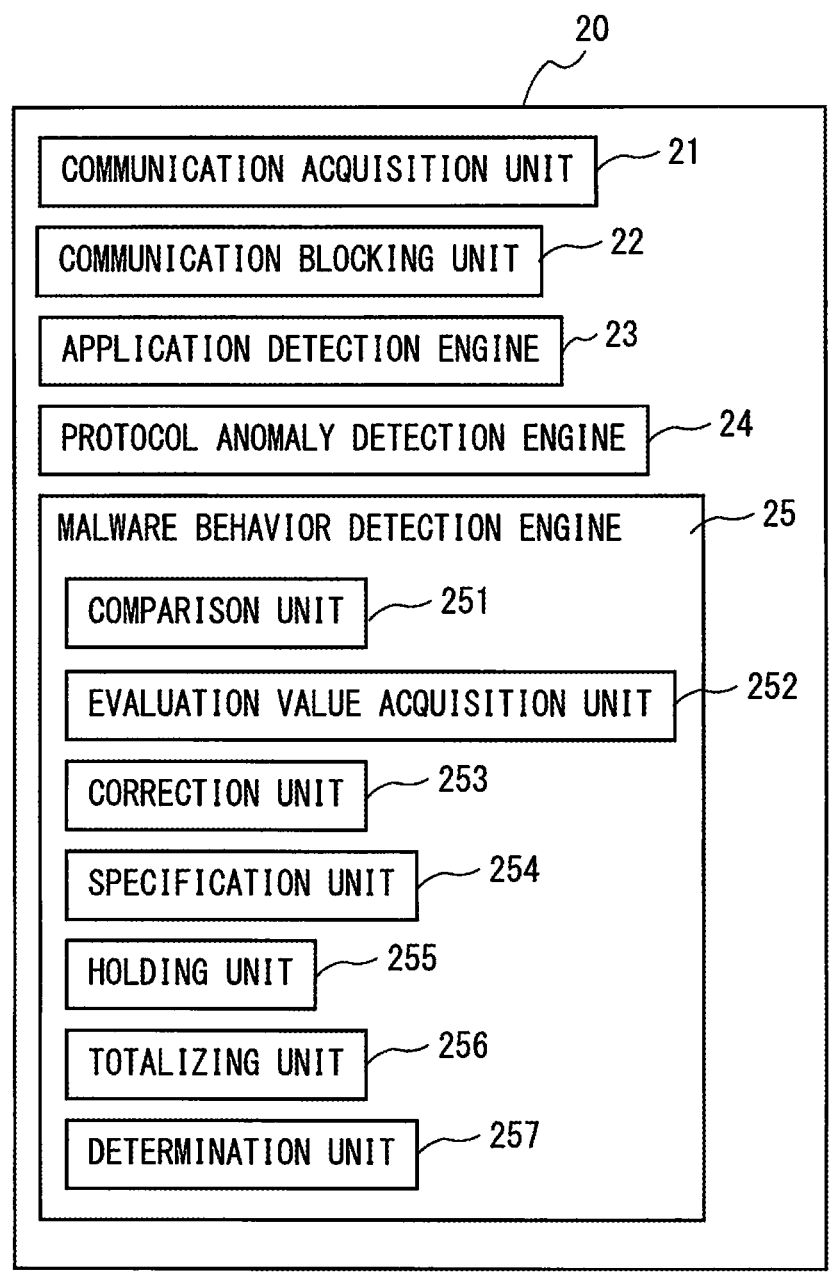
FIG. 3 is a diagram showing a schematic view of the functional configuration of the network monitoring apparatus relating to the embodiment.

FIG. 3 is a diagram showing a schematic view of the functional configuration of a network monitoring apparatus 20 relating to the present embodiment. In FIG. 3, the configuration apart from the network monitoring apparatus 20 (namely, the router 10, nodes 90 and management server 50, etc.) is not illustrated. The network monitoring apparatus 20 functions as an information processing apparatus including a communication acquisition unit 21, a communication blocking unit 22, an application detection engine 23, a protocol anomaly detection engine 24 and a malware behavior detection engine 25, by means of a program recorded in the storage apparatus 14a being read out from the RAM 13a and executed in the CPU 11a. Furthermore, the malware behavior detection engine 25 includes a comparison unit 251, an evaluation value acquisition unit 252, a correction unit 253, a specification unit 254, a holding unit 255, a totalizing unit 256 and a determination unit 257. In the present embodiment, the various functions provided in the network monitoring apparatus 20 are executed by the CPU 11a, which is a generic processor, but all or a part of these functions may be executed by one or a plurality of special processors. Furthermore, all or a part of these functions may be executed by a remotely situated apparatus, or a plurality of apparatuses in disperse locations, by using cloud technology, or the like.

The communication acquisition unit 21 acquires communication sent and received by terminals connected to the network. In the present embodiment, a "terminal" which is the object of monitoring and detection by the network monitoring apparatus 20 includes the nodes 90 which are connected to the network segment 2 and other apparatuses (nodes belonging to other networks, external servers, etc.) which communicate with the nodes 90 via the router 10.

The communication blocking unit 22 blocks a communication by a terminal, if it is determined by the application detection engine 23, the protocol anomaly detection engine 24 or the malware behavior detection engine 25 that the terminal in question is used to conduct an unauthorized activity. In the present embodiment, an example is described in which a countermeasure for blocking the communication by the terminal is applied, if it is determined that the terminal in question is used to conduct an unauthorized activity, but the method of the countermeasure adopted when it is determined that a terminal is used to conduct an unauthorized activity is not limited to blocking of the communication. Upon determining that a terminal is used to conduct an unauthorized activity, the network monitoring apparatus 20 may issue an alert (warning) or implement a cure (for example, removal of malware, elimination of vulnerabilities) in the terminal conducting the unauthorized activity.

The application detection engine 23 is an engine which detects when an application, which is used by malware and is not required for business, is carrying out communication on the network; for example, the application detection engine 23 detects that an application not required for business is running on a node 90 by detecting communication based on the known remote access Trojan (RAT), Peer-to-Peer (P2P) applications, the onion router (Tor), UltraSurf (Proxy tool) and anonymous proxies, etc.

The protocol anomaly detection engine 24 is an engine which detects communication that does not follow protocols on the network, for example, an HTTP anomaly detection engine, an SSL/TLS anomaly detection engine or a DNS anomaly detection engine, or the like. By detecting a communication that does not follow these protocols, the protocol anomaly detection engine 24 detects a node 90 which is used to conduct a communication that does not observe the protocols on the network.

The malware behavior detection engine 25 evaluates the communality between a communication on the network, and a "communication pattern characteristic of malware", for each phase of unauthorized activity by malware, these phases being defined in a malware activity transition model, analyzes malware behavior by monitoring the state of transitions between phases of malware activity, and thereby detects malware infection in a node 90.

Figure 4:
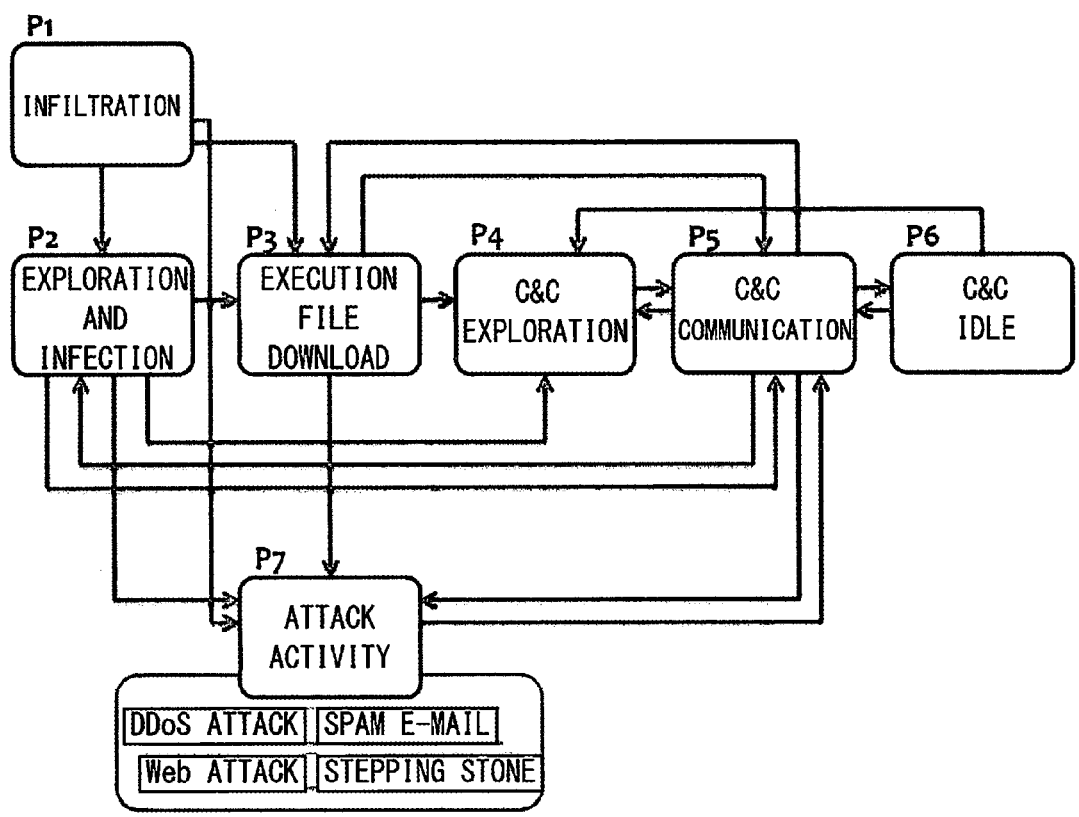
FIG. 4 is a diagram showing a model of malware activity transitions, which is used by a malware behavior detection engine according to the embodiment.

FIG. 4 is a diagram showing a model of malware activity transitions, which is used by the malware behavior detection engine 25 of the present embodiment. Phase P1 to phase P7 are defined in the malware activity transition model shown in the present embodiment, but this is one example used in the present embodiment and the malware activity transition model may be modified, as appropriate, in accordance with the embodiment. Below, each phase in the malware activity transition model relating to the present embodiment will be described.

Phase P1 is an infiltration phase, in other words, a phase where infecting malicious code is downloaded by utilizing a vulnerability in the OS or applications, when, for instance, a file attachment or an e-mail URL in a targeted e-mail attack is clicked, or a URL on a web site (mainly, an SNS site) is clicked, and so on. The transition destination from phase P1 is either phase P2, phase P3 or phase P7 in the case of an autonomous malware infiltration, such as a worm, and is either phase P2 or phase P3 in the case of bot-type malware.

Phase P2 is an exploration and infection phase (diffusion phase), in other words, a phase of exploring an infected terminal which has a vulnerability, and targeting the vulnerability to introduce an exploit code to infect the terminal, or causing an exploit code to be introduced from another terminal to infect the terminal. In the exploration and infection phase, an exploit code is introduced into the targeted terminal via an already infected terminal, and the terminal into which the exploit code has been introduced becomes infected with the malware. For example, a diffusion activity is performed by utilizing an MS-RPC or file sharing vulnerability in the Windows (registered trademark) OS. In the case of bot-type malware, an infection activity (malware diffusion activity) is executed based on a command issued by an attacker (herder) via a command and control (C&C) server (phase P5). The transition destination from phase P2 is either phase P3 or phase P7 in the case of autonomous malware, such as a worm, and phase P3 in the case of bot-type malware. The exploration and infection phase has two aspects. One is a phase in which an infecting terminal executes an infection activity. Another aspect is a phase in which an exploit code is introduced to infect a victim (infection target) terminal.

Phase P3 is an execution file download phase, in other words, a phase in which, after introduction of the exploit code, the malware in itself is downloaded and activated from a malware delivery site or from an already infected terminal, or new malware is downloaded from a site designated by a command from the attacker (via a C&C server), with the object of avoiding detection of the malware by anti-virus products and/or adding new functions, and so on. The HTTP protocol, FTP protocol or TFTP protocol are used principally for downloading the malware in itself. Furthermore, a protocol that is unique to the malware may also be used. The transition destination from phase P3 is either phase P4 or phase P5 in the case of remote-controlled malware, such as a bot, and is generally phase P2 or phase P7 in the case of autonomous malware, such as a worm.

Phase P4 is a C&C exploration phase, in other words, a phase of exploring the C&C server in order to receive a command from an attacker. Malware which transfers to this phase is principally remote-controlled malware, such as a bot. Generally, the FQDN of a plurality of C&C servers are incorporated into malware and a DNS query is used to resolve the address. In the case of a P2P-type botnet, a P2P protocol (generic or unique protocol) is used to search for the C&C node. Malware of a type which has a hard-coded IP address is not active in this phase. The transfer destination from phase P4 is phase P5.

The phase P5 is a C&C communication phase (including Internet connection check), in other words, a phase in which data is sent and received in connection with the C&C server, in order to receive commands from the attacker and to report the command execution results (respond), and the like. There also exists malware which checks the Internet connection before connecting to the C&C server. In the connection to the C&C server, any of the IP addresses which were successfully resolved in phase P4 or any of the IP addresses which are hard-coded in the malware are used. When a command is received from the C&C server, the malware activity transfers from phase P5 to phase P2, phase P3 or phase P7, in accordance with the commands from the attacker. The execution results are reported to the attacker via the C&C server. If there is no command from the attacker, then the malware activity transfers to phase P6. On the other hand, if the malware fails to connect to the C&C server, then the malware retries connection with another IP address, and if this fails also, then the malware returns to phase P4 and either searches for another C&C server or stops activity. The existence of malware which repeatedly and endlessly reconnects until the connection is successful is also reported. Furthermore, if an abnormality occurs in the C&C communication path and recovery is not possible, then the malware activity transfers to phase P4. Moreover, there is also malware which performs an operation of changing the C&C server at prescribed time intervals, and in this case, the malware activity transfers to phase P4.

Phase P6 is a C&C idle (halt) phase, in other words, a phase of waiting for a command from the attacker. The malware periodically accesses the C&C server to maintain the communication path, and also waits for a command from the attacker. When the malware receives a command from the attacker, the malware activity transfers to phase P5. Moreover, there is also malware which performs an operation of changing the C&C server at prescribed time intervals, and in this case, the malware activity transfers to phase P4.

Phase P7 is an attack activity phase, in other words, a phase in which various attack activities are carried out in accordance with a command from the attacker (bot type) or the exploit code (worm type) which is incorporated into the malware. Activity corresponding to phase P1 may be carried out in order to find an attack target. Attack activities include DoS attacks, spam mail attacks, Web attacks (Web falsification), stepping stones, etc.

The malware behavior detection engine 25 has a comparison unit 251, an evaluation value acquisition unit 252, a correction unit 253, a specification unit 254, a holding unit 255, a totalizing unit 256 and a determination unit 257 (see FIG. 3), hence the malware behavior detection engine 25 monitors the transitional states between the phases of malware activity which are defined as described above, and detects a malware infection in the nodes 90. Below, the respective functional units of the malware behavior detection engine 25 will be described.

The comparison unit 251 compares communication newly acquired by the communication acquisition unit 21 (packets, which have been newly acquired and become the object of processing; hereinafter, called "input packets"), with previously held communication patterns. Peculiar communication patterns which appear as a result of various malware activities are previously defined in the held communication patterns. In the present embodiment, a plurality of communication patterns are defined in advance for each of the phases of the malware activity transition model, and are held in the network monitoring apparatus 20 or the management server. A communication pattern relating to phase Pn (here, n is an integer from 1 to 7) is expressed as "Pn–m" (where m is number equal to or greater than 1). It should be noted that there are also communication patterns which are not dependent on any of the phases (in other words, which may appear in a plurality of different phases). In the present embodiment, a communication pattern which is not dependent on any of the phases P1 to P7 is expressed as "P0–m".

As a result of the comparison by the comparison unit 251, the evaluation value acquisition unit 252 acquires a grade for the input packet, in the form of a grade (evaluation value) which is previously set in respect of a communication pattern which matches or approximates the input packet (such a packet is referred to simply as a "corresponding" communication pattern below). The grade (Gr) is a value which indicates the "extent to which the terminal is inferred to be carrying out unauthorized activity (malware activity)", and which is assigned to the individual communication patterns. In the present embodiment, the grade (Gr) is in the range of $0 \leq Gr \leq 1.0$ (fraction to one decimal point). Grade (Gr)=0 indicates the lowest possibility of the communication pattern occurring as a result of malware activity, and the closer the value of the grade to 1, the higher the possibility that the communication pattern has occurred as a result of malware activity. The grade (Gr) is specified in advance for each communication pattern, based on the frequency of appearance as a communication pattern in a normal application. In other words, a grade of a higher value is assigned to a communication which has a low possibility of appearing as a communication resulting from an authorized application, and a lower grade is assigned to a communication which has a high possibility of appearing as a communication resulting from an authorized application. In the present embodiment, a grade set in advance for the communication pattern Pn–m is expressed as "Gr(Pn–m)" and a grade assigned to a terminal (h) which carries out the communication corresponding to the communication pattern Pn–m is expressed as "Gr(h, Pn–m)".

Even with the same communication pattern, different grades (Gr) are assigned based on the conditions. For example, if two conditions associated with a communication pattern "A: destination does not match a C&C server" and "B: destination matches one C&C server" are set, then the conditions are determined as indicated below, and different grades are assigned depending on whether or not the destination matches a registered C&C server.

IF (Pn–m=TRUE) AND (A) THEN Gr(Pn–m)=0.1, ACTION=register in C&C server candidate list IF (Pn–m=TRUE) AND (B) THEN Gr(Pn–m)=0.6, ACTION=No Moreover, in the present embodiment, the evaluation value acquisition unit 252 acquires a grade in accordance with the results of a correlation analysis between the input packet, and other packets sent or received before or after the input packet by a terminal relating to the input packet (called "preceding packets" and "subsequent packets" below). More specifically, in the present embodiment, the evaluation value acquisition unit 252 determines whether or not there is continuity between a phase acquired in respect of a communication (input packet) acquired by the communication acquisition unit 21 and a phase acquired in respect of another communication (preceding packet or subsequent packet) carried out before or after the communication in question, in respect of the terminal relating to the communication in question, and acquires a grade if it is determined that there is continuity.

The correction unit 253 corrects the grade acquired by the evaluation value acquisition unit 252, in accordance with the results of a correlation analysis between the input packet and the preceding packet or subsequent packet. More specifically, in the present embodiment, the correction unit 253 determines whether or not there is continuity between a phase acquired in respect of a communication (input packet) acquired by the communication acquisition unit 21 and a phase acquired in respect of another communication (preceding packet or subsequent packet) carried out before or after the communication in question, in respect of the terminal relating to the communication in question, and corrects the grade acquired by the evaluation value acquisition unit 252 so as to be larger, if it is determined that there is continuity, compared to when it is determined that there is no continuity.

In other words, in the present embodiment, by means of the evaluation value acquisition unit 252 and the correction unit 253, a correlation analysis is carried out between a newly acquired communication (input packet) and a past or future communication (preceding packet or subsequent packet) by the terminal relating to the communication in question, and if it is considered that there is "continuity of a kind which raises the extent to which the communication is inferred to be malware activity", between the input packet and the preceding packet or subsequent packet, then the grade corresponding to the past or future communication (preceding packet or subsequent packet) is acquired, and the grade corresponding to the newly acquired communication (input packet) is corrected.

The specification unit 254 specifies the phase and grade relating to the terminal in question, in respect of the input packet. The specification unit 254 specifies the phase Pn which is set in advance in respect of the communication pattern Pn–m corresponding to the input packet, based on the comparison by the comparison unit 251, to be the phase relating to the terminal in question. Furthermore, the specification unit 254 may specify the grade Gr (Pn–m) acquired by the evaluation value acquisition unit 252, directly, as the grade for the input packet, but if the grade is corrected by the correction unit 253, then the specification unit 254 specifies the corrected value as the grade for the input packet.

The holding unit 255 holds the maximum values of the specified grades for each phase, for each of the terminals. In the present embodiment, for each phase Pn of the malware activity transition model, the holding unit 255 holds the maximum value of the grade Gr(Pn–m) for the communication pattern Pn–m detected in respect of the phase Pn in question, as the grade for the phase Pn, and expresses same as "PGr (Pn)". The grade for the phase Pn in the terminal (h) is expressed as "PGr(h, Pn)" and is acquired by the following equation.

$$PGr(h,Pn)=\max\{Gr(Pn-m)|Pn-m \in h\}$$

In the present embodiment, the holding unit 255 uses a grade management table holding the maximum grade value for each phase, and each terminal, to manage the grade of each phase, in each terminal (not illustrated). A grade PGr(h, Pn) for each phase Pn is held in the grade management table, for each of the terminals (h) identified by the network monitoring apparatus 20. As described above, the grade PGr(h, Pn) for each phase Pn is the maximum value of the grades Gr(Pn–m) for the detected communication patterns Pn–m in respect of the phase Pn in question. Therefore, when a new grade is specified in respect of any phase, the grade PGr(h, Pn) held in the grade management table is compared with the newly specified grade and updated to the maximum value. The maximum value Gr(h, Pn–m) of the grade Gr(Pn–m) for each communication pattern Pn–m is also held in the storage apparatus 14a.

The totalizing unit 256 acquires the maximum values PGr (h, Pn) of the grades of the respective phases from phase P1 to phase P7, for each terminal, and totalizes these maximum values.

The determination unit 257 determines whether or not the terminal is carrying out unauthorized activity, based on the maximum values PGr(h, Pn) of the grades for each phase, in the terminal (h) that is the processing object. In the present embodiment, the determination unit 257 determines whether or not the terminal is carrying out unauthorized activity based on the total value obtained by the totalizing unit 256. More specifically, the determination unit 257 applies a prescribed weighting to the total value, to calculate a "value indicating the degree of possibility of activity by malware" (called "possibility of malware activity" below), and if this value exceeds a prescribed threshold value, then the determination unit 257 determines that the terminal in question is carrying out unauthorized activity. The possibility of malware activity for the terminal (h) indicates the degree of possibility that the terminal (h) is infected by malware, and is expressed as "IR(h)". The possibility of malware activity for the terminal (h) takes a value between 0 (no infection) to 100 (high possibility of infection). In other words, in the present embodiment, the possibility of malware activity for the terminal (h) is defined as indicated below. Here, φ indicates the malware activity coefficient.

$$IR(h)=\min((\phi \Sigma_{n=1}^{7} PGr(h,Pn)),1) \times 100$$

In general, a terminal in which communication patterns are detected in a large number of (continuous) phases in the activity transition model can be determined as having a higher possibility of being infected with malware, than a terminal in which communication patterns are detected in a small number of phases, and therefore a malware activity coefficient φ is introduced (in the present embodiment, the coefficient φ is set specifically to a value of 0.5). The possibility of malware activity IR(h) described above is calculated and updated each time a communication pattern corresponding to the communication patterns relating to the terminal (h) is detected.

In the present embodiment, a terminal having a possibility of malware activity of 0 to 49 is defined as a "clean terminal", a terminal having a possibility of malware activity of 50 to 89 is defined as a "grey terminal", and a terminal having a possibility of malware activity of 90 to 100 is defined as a "black terminal". The possibility of malware activity and the definition "clean", "grey" or "black" is displayed for each terminal, as a real-time report information, on a management screen (device list screen) of an administrator terminal. Furthermore, an overview of the detected "communication patterns" and a list indicating the number of times each pattern has been detected is displayed for each terminal, as detailed information. The threshold values of the "clean", "grey" and "black" definitions relating to the possibility of malware activity may be set by the administrator.

<Flow of Processing>

Next, the flow of processing executed by the system 1 relating to the present embodiment will be described with reference to a flowchart. The specific contents of the processing and the processing sequence indicated in the flowchart described below are examples for implementing the present disclosure. The specific contents of the processing and the processing sequence may be selected, as appropriate, in accordance with the mode of implementing the present disclosure.

When the network monitoring apparatus 20 is connected to a new network, before starting a detection process for each packet as described below, the network monitoring apparatus 20 executes a network configuration analysis/learning process, as preliminary processing. More specifically, when connected to a new network, the network monitoring apparatus 20 acquires packets for a prescribed period of time, and by analyzing the acquired packets, analyzes the configuration of the network that is the object of monitoring, learns the information required for malware detection (a device list (device types, OS types, MAC/IP addresses, etc.), the address system of the network that is the object of monitoring, the DNS server information, mail server information, proxy (HTTP/SOCKS) information, Active Directory information, etc.), and stores same in the storage apparatus 14a, or the like.

The network configuration analysis/learning process is executed continuously by the network monitoring apparatus 20, after the detection process described below has started. In other words, the network monitoring apparatus 20 compares the information obtained by analyzing the acquired packets with information learnt by the abovementioned analysis/learning process, and held in the storage apparatus 14a of the network monitoring apparatus 20, and if, as a result of this comparison, the newly obtained information is different from the held information, then the network monitoring apparatus 20 determines that the configuration in the network segment 2 has changed, and uses the newly obtained information to update the information held in the storage apparatus 14a of the network monitoring apparatus 20.

Figure 5:
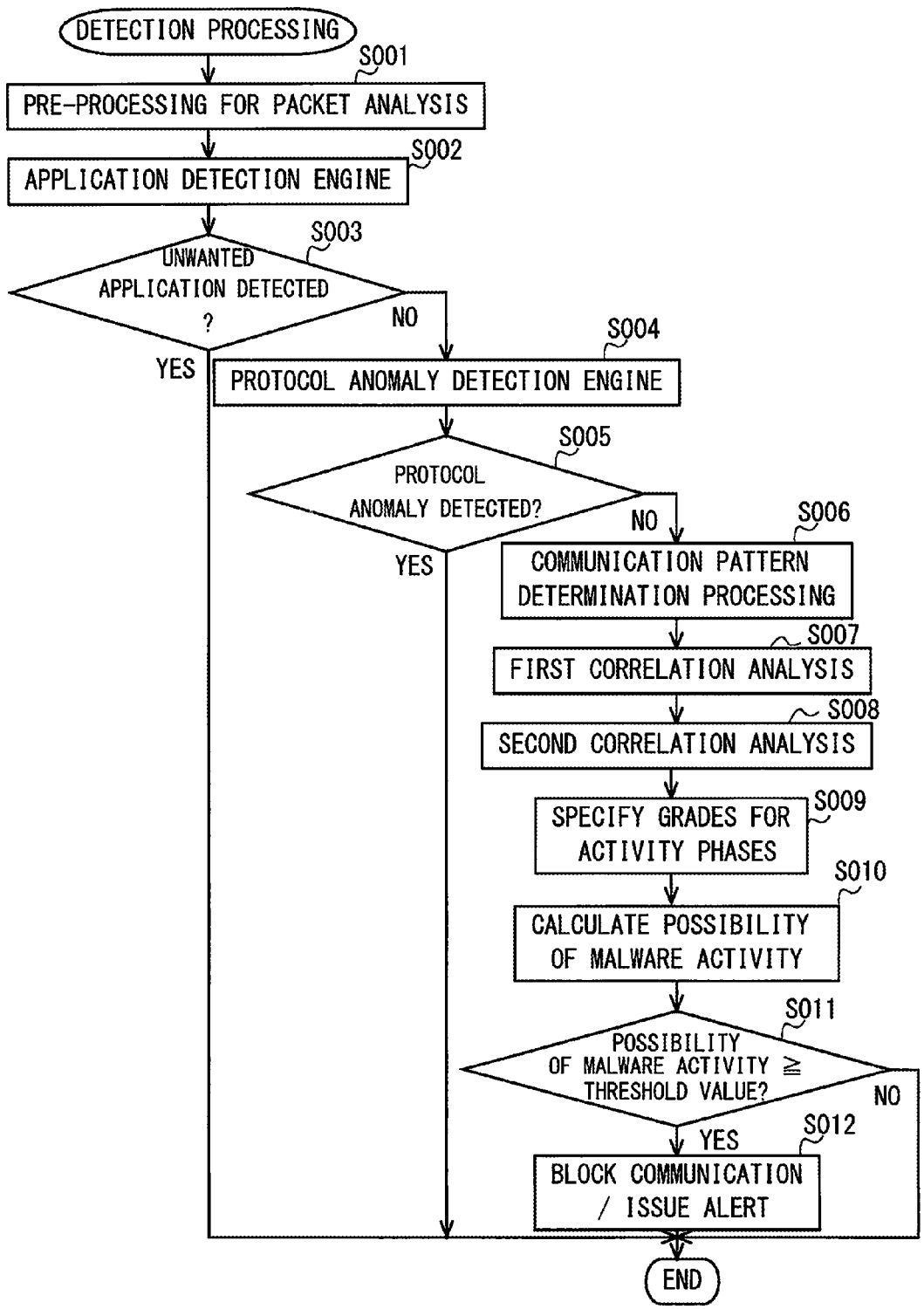
FIG. 5 is a flowchart showing an overview of a flow of detection processing for each packet relating to the embodiment.

FIG. 5 is a flowchart showing an overview of the flow of detection processing for each packet relating to the present embodiment. The detection processing relating to the present embodiment is executed by the network monitoring apparatus 20 whenever a packet passing over the network is acquired.

In step S001, pre-processing for packet analysis is executed. When a new communication (input packet) is acquired by the communication acquisition unit 21, the network monitoring apparatus 20 shapes and classifies the input packet, and associates the packet with a valid existing flow. Furthermore, the network monitoring apparatus 20 classifies the input packets and associates same with an existing flow, in terminal units, (transmission source/destination IP address (MAC address) units), and protocol units (TCP/UDP, ICMP, DNS, HTTP, HTTPS, IRC, FTP, TFTP, SOCKS, NetBIOS, etc.). Thereupon, the processing advances to step S002.

From step S002 to step S005, processing is carried out by the application detection engine 23 and the protocol anomaly detection engine 24. The network monitoring apparatus 20 relating to the present embodiment uses detection engines (detection programs) of the three types described above to detect an unauthorized communication by a terminal connected to the network, but in the present embodiment, upon acquiring a packet, the network monitoring apparatus 20 implements detection by the application detection engine 23 and the protocol anomaly detection engine 24, and then implements detection by the malware behavior detection engine 25. In other words, in the present embodiment, the malware behavior detection engine 25 determines whether or not a node 90 is used to conduct unauthorized activity based on communication which has not been detected as an unauthorized communication by the other detection units (the application detection engine 23 and the protocol anomaly detection engine 24). By adopting this composition, according to the present embodiment, the number of packets processed by the malware behavior detection engine 25 is reduced, and the load created by the operation of the behavior detection engine can be reduced. However, the malware behavior detection engine 25 may operate independently, or may operate in combination with the other detection engines. Furthermore, the processing sequence of the detection engine when the packets are acquired is not limited to the example indicated in the present embodiment.

When an unnecessary application is detected by the application detection engine 23 or when a protocol anomaly is detected by the protocol anomaly detection engine 24, the processing advances to step S012, and blocking is implemented or an alert is issued. On the other hand, if an unnecessary application or a protocol anomaly is not detected, then the processing advances to step S006. In the flow chart, the processing from step S006 to step S011 in this flowchart corresponds to the processing performed by the malware behavior detection engine 25.

In step S006, a communication pattern determination process is carried out. The comparison unit 251 determines the communality between the input packet and a previously defined communication pattern (Pn–m), by comparing the input pack and the previously defined communication pattern (Pn–m). Here, if it is determined that there is communality with respect to the communication pattern (Pn–m), then the phase in the activity transition model of the terminal (h) relating to the input packets is specified as the phase Pn(h). Furthermore, the evaluation value acquisition unit 252 acquires, as a result of the determination, the grade Gr (Pn–m) of the communication pattern determined to be matching or approximate (corresponding), to be the grade Gr(h, Pm–m) for the input packet in association with the terminal (h). Moreover, the network monitoring apparatus 20 registers the transmission source terminal or the destination terminal of the communication in question, in a "malware delivery server candidate list" or "C&C server candidate list", based on the detected communication pattern. Here, a determination and evaluation is made in with respect to the communication patterns of all phases, by taking account of lost packets. In order to associate with the existing determined flow, a determination is not made with regard to an input packet which does not require an additional determination process, and only updating of the statistical information is carried out. Thereupon, the processing advances to step S007.

In step S007, a first correlation analysis is carried out. The evaluation value acquisition unit 252 picks up a C&C communication which cannot be detected in step S006. The evaluation value acquisition unit 252 picks up a communication which has triggered a transition to the exploration and infection phase P2, the execution file download phase P3 and the attack activity phase P7, and the network monitoring apparatus 20 registers the transmission source terminal or the destination terminal of the communication in question, in the C&C server candidate list. The contents of processing of the first correlation analysis are described below with reference to FIG. 6 to FIG. 8 and FIG. 9. Thereupon, the processing advances to step S008.

In step S008, a second correlation analysis is carried out. The correction unit 253 analyzes the correlation between the continuity of the phase which was active immediately before, and the behavior of another (infected) terminal, in respect of the activity phase Pn(h) of the terminal (h) determined in step S006. If, as a result of this analysis, a communication pattern having a high risk of malware behavior is discovered, then the correction unit 253 corrects the grade Gr(h, Pn–m) of the communication pattern (Pn–m) in the terminal (h) determined in step S0006, using the following equation, and assigns a higher grade.

$$Gr(h,Pn-m)=\theta \cdot Gr(h,Pn-m)$$

Here, the malware behavior similarity coefficient θ is in the range of 1.0 to 2.0. Here, 1.0 means "no similarity". The contents of processing of the second correlation analysis, and the malware behavior similarity coefficient θ are described below with reference to FIG. 6 to FIG. 8 and FIG. 10 to FIG. 14. Thereupon, the processing advances to step S009.

In step S009, grades (PGr) are specified for the activity phases. The specification unit 254 specifies a grade PGr(h, Pn)i for a phase Pn, from the grade Gr(h, Pn–m) of the communication pattern in the corresponding terminal h, based on the processing results from step S006 to step S008. Here, PGr(h–Pn)i–1 indicates the grade for the phase Pn up to the previous processing.

$$PGr(h,Pn)i=\max\{PGr(h,Pn)i-1,Gr(h,Pn-m)\}$$

Thereupon, the processing advances to step S010.

In step S010, the possibility of malware activity (IR(h)) is calculated. The totalizing unit 256 and the determination unit 257 calculate the possibility of malware activity IR(h) for the terminal h. The specific calculation method is as described above in the explanation relating to the totalizing unit 256 and the determination unit 257. Thereupon, the processing advances to step S011.

In step S011 and step S012, if the possibility of malware activity IR(h) is equal to or greater than a prescribed threshold value, then a countermeasure such as blocking of the terminal or issuing of an administrator alert, is carried out. The determination unit 257 determines whether or not the possibility of malware activity in the terminal calculated in step S010 is equal to or greater than the prescribed threshold value representing "black" (step S011). If the possibility of malware activity is "black", then the communication blocking unit 22 carries out a countermeasure, such as blocking the communication by the terminal in question, or issuing an alert to the administrator (step S012). Furthermore, if the possibility of malware activity is "grey", then the network monitoring apparatus 20 may issue an alert to the administrator. If the possibility of malware activity is "clean", then a countermeasure such as blocking or issuing an alert is not carried out. Subsequently, the processing indicated in the flowchart is terminated.

Figure 6:
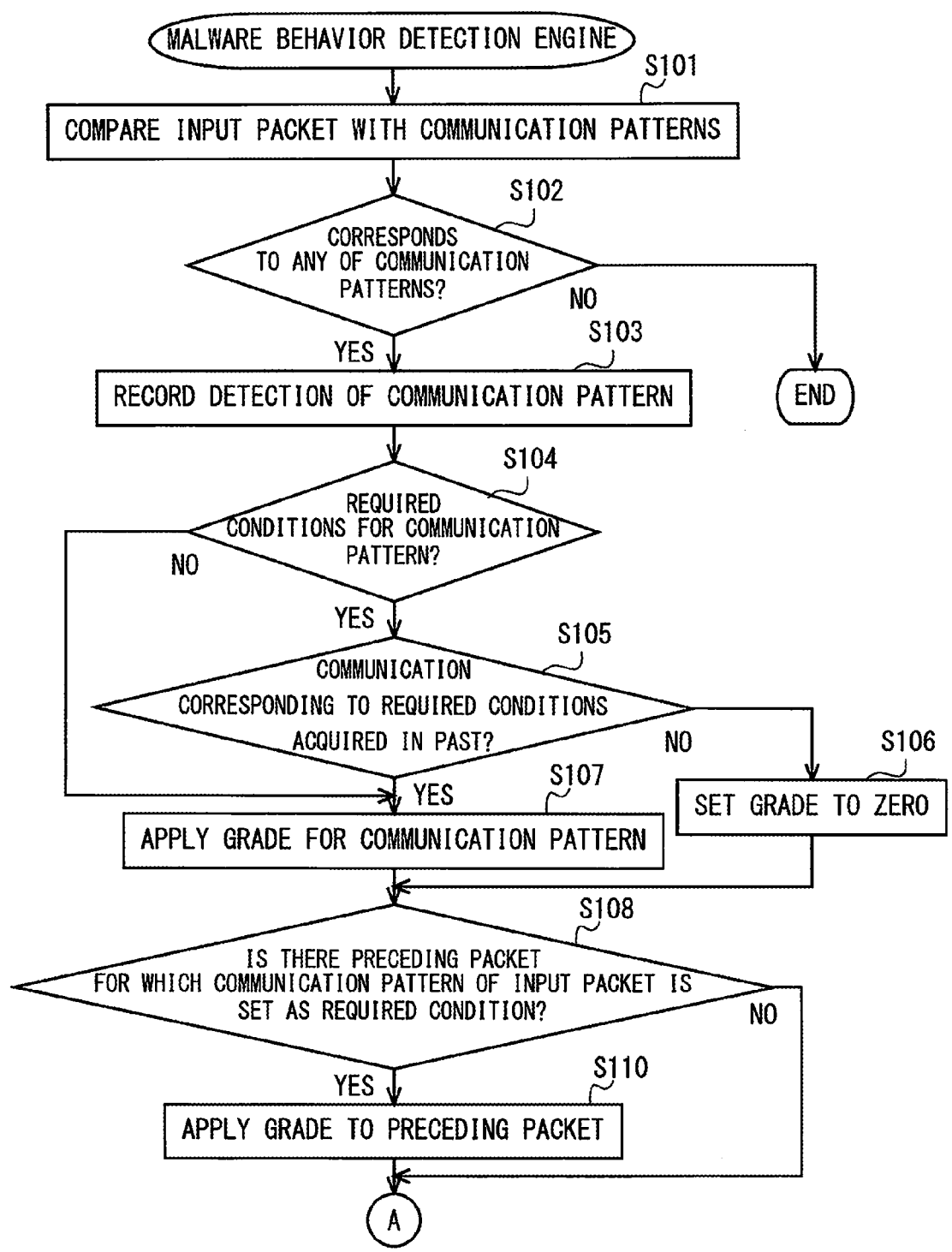
FIG. 6 is a flowchart (A) showing a flow of detection processing performed by the malware behavior detection engine relating to the embodiment.
Figure 7:
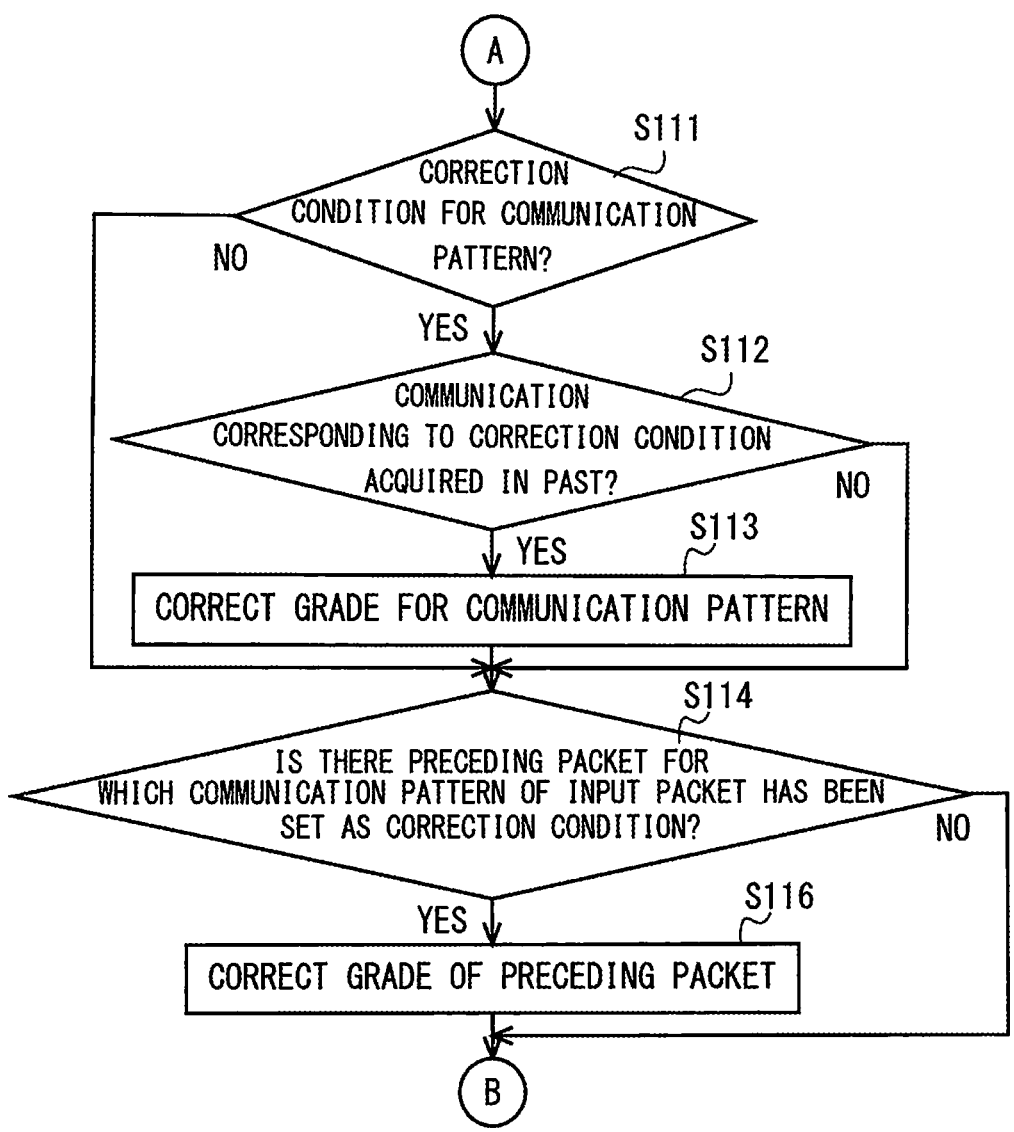
FIG. 7 is a flowchart (B) showing a flow of detection processing performed by the malware behavior detection engine relating to the embodiment.
Figure 8:
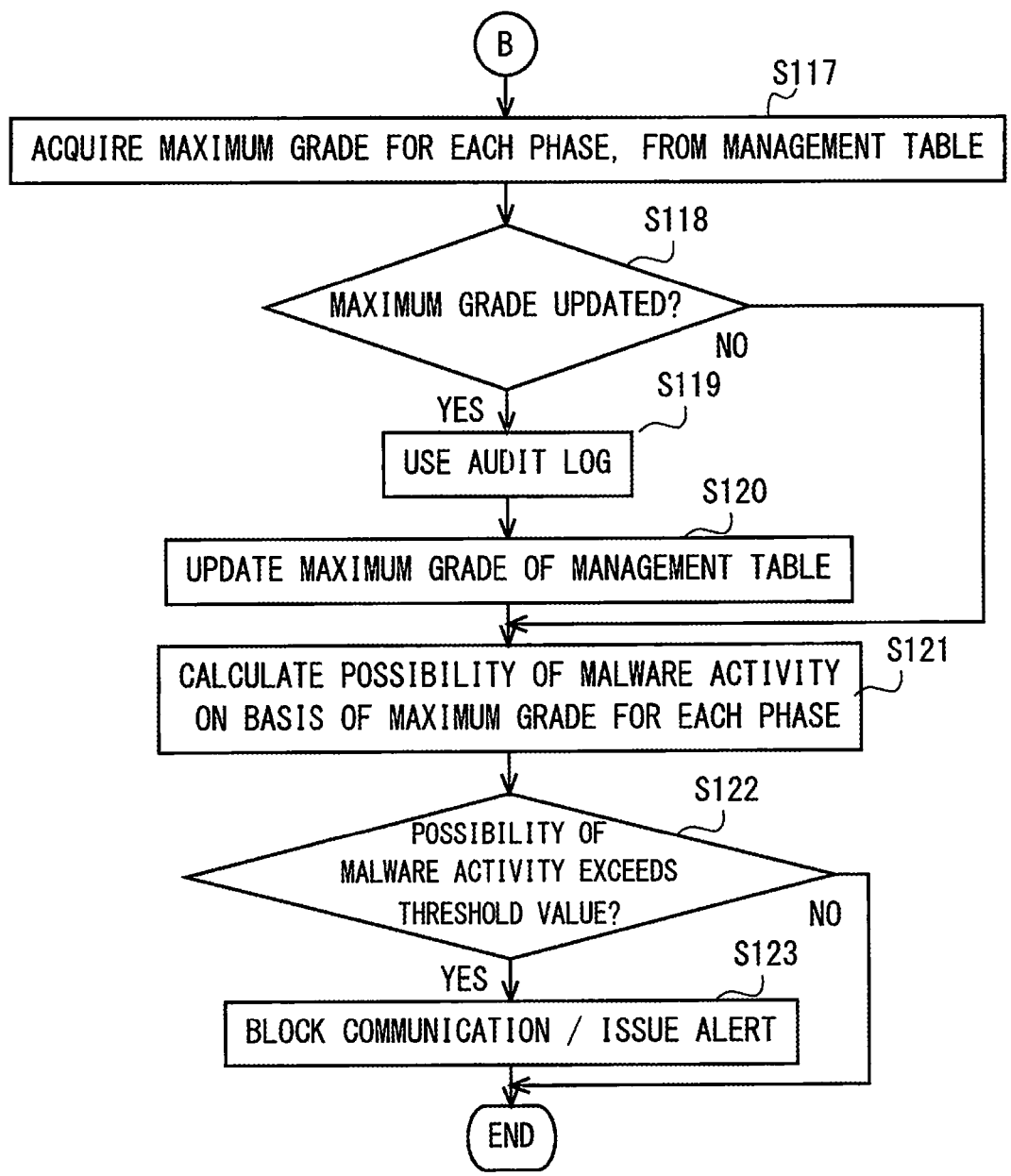
FIG. 8 is a flowchart (C) showing a flow of detection processing performed by the malware behavior detection engine relating to the embodiment.

FIG. 6 to FIG. 8 is a flowchart showing a flow of a detection process performed by the malware behavior detection engine 25 relating to the present embodiment. The flowchart gives a more detailed explanation of the processing from step S006 to step S012 of the detection processing described in relation to FIG. 5. More specifically, step S101 to step S103 give a more detailed explanation of the communication pattern determination processing described in step S006 in FIG. 5; step S104 to step S110 give a more detailed explanation of the first correlation analysis processing described in step S007; step S111 to step S116 give a more detailed explanation of the second correlation analysis processing described in step S008; and step S117 to step S120 give a more detailed explanation of the grade specification processing for activity phases described in step S009. Furthermore, step S121 corresponds to step S010 in FIG. 5, and step S122 and step S123 correspond to step S011 and step S012.

In step S101 and step S102, it is determined whether or not the acquired packet (input packet) corresponds to any of the previously defined communication patterns. The comparison unit 251 determines the communality between the input packet and a previously defined communication pattern (Pn–m), by comparing the input packet and the previously held communication pattern. As a result of this determination, if it is determined that the input packet does not correspond to any communication pattern, then the processing relating to the packet in question is terminated, and the processing indicated in the flowchart is terminated. On the other hand, if it is determined that the packet does correspond to any one of the communication patterns, then the processing advances to step S103.

In step S103, the fact that a communication pattern (Pn–m) determined to be corresponding has been detected is recorded in relation to the terminal relating to the input packet. Furthermore, the evaluation value acquisition unit 252 acquires the phase Pn to which the communication pattern (Pn–m) corresponding to the input packet belongs, and the grade Gr (Pn–m) set in advance for the communication pattern (Pn–m), respectively, as the phase Pn(h) in the terminal (h) relating to the input packet and the grade Gr(h, Pn–m) for the phase in question. Thereupon, the processing advances to step S104.

In step S104 and step S105, if required conditions are set for the communication pattern corresponding to the input packet, then it is determined whether or not a communication corresponding to the required conditions has been acquired in the past. If required conditions have not been set, then the processing advances to step S107. Here, the required conditions are conditions for determining whether or not a grade Gr(Pn–m) set in advance for a communication pattern (Pn–m) determined to correspond to the input packet in step S101 may be specified as the grade Gr(h, Pn–m) for the phase Pn(h)

of the terminal (h) relating to the input packet in question. For example, a communication pattern of "P5-4: HTTP communication (proxy/non-proxy) having HTTP standard port (80) as the destination port" is a general communication in HTTP, and an required condition for this communication pattern is that any of the "HTTP malicious communication patterns" defined in "P0-1 to P0-15" is detected. Therefore, if these required conditions are satisfied, then the grade Gr(h, P5-4) of the communication pattern P5-4 is specified in respect of the input packet, and if the required conditions are not satisfied, then the grade Gr(h, P5-4) of the communication pattern P5-4 is not specified in respect of the input packet.

In other words, the evaluation value acquisition unit 252 determines whether there is continuity between the phase acquired in respect of the input packet and the phase acquired in respect of another communication (preceding packet) carried out before the communication in question, in respect of the terminal relating to the communication in question, by determining whether or not a communication acquired in the past satisfies the required conditions. If it is determined that the required conditions are not satisfied, then the processing advances to step S106, and the grade of the input packet is set to 0 (zero). On the other hand, if it is determined that the required conditions are satisfied, then the processing advances to step S107.

In step S107, grades are assigned for the phases in the terminal relating to the input packet. The evaluation value acquisition unit 252 acquires a grade Gr(Pn–m) previously defined for the communication pattern Pn–m which is determined to be corresponding, in respect of the input packet, and sets same as the grade Gr(h, Pn–m) for the phase Pn(h) in the terminal (h). Thereupon, the processing advances to step S108.

In step S108, it is determined whether or not the input packet corresponds to the required conditions of a communication pattern detected in the past. In other words, in step S108, at the current time, which corresponds to the future from the viewpoint of a communication acquired in the past (preceding packet), it is determined whether or not a communication (input packet) corresponding to the required conditions has been detected. The evaluation value acquisition unit 252 determines whether or not a communication pattern has been detected in the past, for which the communication pattern of the input packet has been set as an required condition. As a result of this determination, if a communication pattern having the communication pattern relating to the input packet as an required condition has not been detected in the past, the processing advances to step S111. On the other hand, if, as a result of this determination, a communication pattern having the communication pattern relating to the input packet as an required condition has been detected in the past, the processing advances to step S110.

In step S110, grades are assigned for the phase of the communication acquired in the past (preceding packet). The evaluation value acquisition unit 252 acquires and assigns a grade Gr(Pn–m) previously defined for the communication pattern in question (Pn–m), to the communication detected in the past. Thereupon, the processing advances to step S111.

In step S111 and step S112, if a grade correction condition is set for the communication pattern corresponding to the input packet, then it is determined whether or not a communication corresponding to the grade correction condition has been acquired in the past. If a grade correction condition has not been set, then the processing advances to step S114. Here, a grade correction condition is a condition for determining whether or not a grade Gr(Pn–m) set previously for the communication pattern (Pn–m) determined to correspond to the input packet in step S101 should be corrected to a higher value. The correction unit 253 determines whether or not a communication corresponding to a grade correction condition has been detected in the past in respect of the terminal relating to the input packet. If it is determined that the grade correction condition is not satisfied, then grade correction is not carried out and the processing advances to step S114. On the other hand, if it is determined that the grade correction condition is satisfied, then the processing advances to step S113.

In step S113, grade correction is carried out. The correction unit 253 corrects the grade Gr(h, Pn–m) assigned in step S107, in accordance with the correction value set in advance in respect of the grade correction condition which is determined to have been satisfied in step S112. For example, if the correction value is 1.5, then the value of the grade Gr(h, Pn–m) is multiplied by 1.5 times. Thereupon, the processing advances to step S114.

In step S114, it is determined whether or not the input packet corresponds to the grade correction condition of a communication pattern detected in the past. In other words, in step S114, at the current time, which corresponds to the future from the viewpoint of a communication acquired in the past (preceding packet), it is determined whether or not a communication (input packet) corresponding to the grade correction condition has been detected. The correction unit 253 determines whether or not a communication pattern has been detected in the past, for which the communication pattern of the input packet has been set as a grade correction condition. As a result of this determination, if a communication pattern having the communication pattern relating to the input packet as a grade correction condition has not been detected in the past, then the processing advances to step S117. On the other hand, if, as a result of this determination, a communication pattern having the communication pattern relating to the input packet as a grade correction condition has been detected in the past, then the processing advances to step S116.

In step S116, grade correction relating to a past communication (preceding packet) is carried out. The correction unit 253 corrects the grade assigned to the terminal relating to the communication pattern detected in the past, by the correction value defined in advance in relation to the grade correction condition. For example, if the correction value is 1.5, then the grade is multiplied by 1.5 times. Thereupon, the processing advances to step S117.

In step S117 to step S120, a maximum grade updating process is carried out for each phase. Firstly, the network monitoring apparatus 20 acquires the maximum grade (the value after correction in the case of a grade which is corrected), which is held for each detection phase (P0 to P7) in the terminal relating to the input packet, from the grade management table (step S117), and determines whether or not the maximum grade has been updated, for each phase, by comparing the maximum grade with the grade specified by the specification unit 254 as a result of the processing from step S101 to step S116 (step S118). Here, if it is determined that the maximum grade has not been updated, then the processing advances to step S121. On the other hand, if it is determined that the maximum grade has been updated, then the holding unit 255 uses the newly assigned grade to update the maximum grade recorded in the grade management table, and saves this maximum grade (step S120). During this process, an audit log is kept (step S119). Thereupon, the processing advances to step S121.

In step S121, the possibility of malware activity in the terminal is calculated. The totalizing unit 256 totalizes the maximum grade which has been determined for each phase in the terminal h, and the determination unit 257 calculates the possibility of malware activity IR(h) in the terminal h, by multiplying by a malware activity coefficient. The specific calculation method is as described above in the explanation relating to the totalizing unit 256 and the determination unit 257. Thereupon, the processing advances to step S122.

In step S122 and step S123, the presence or absence of a malware infection in the object node 90 is determined. The determination unit 257 determines whether or not the possibility of malware activity IR(h) calculated in step S121 exceeds a prescribed threshold vale (step S122). Here, if it is determined that the possibility of malware activity IR(h) has exceeded a threshold value, then the network monitoring apparatus 20 implements the prescribed countermeasure for when a malware infection is detected. Examples of the countermeasure for when a malware infection is detected include starting blocking of the communication at the node 90 by the communication blocking unit 22, and issuing an alert (warning) indicating that the node 90 in question is infected with malware. On the other hand, if it is determined that the possibility of malware activity IR(h) has not exceeded the threshold value, then the countermeasure for when a malware information has been detected, such as blocking of the communication or issuing a warning, etc. is not implemented. Subsequently, the processing indicated in the flowchart is terminated.

The network monitoring apparatus 20 can block the communication by the node 90 by using, for example, a method for deriving a packet transmission destination due to ARP impersonation in respect of the node 90, a method for instructing the router 10 to discard a communication relating to the node 90, or a method for changing and separating the VLAN to which the node 90 belongs. Furthermore, if the network monitoring apparatus 20 is installed (incorporated) into the router 10, then it is also possible to directly block communication which is sent or received by the node 90. Moreover, the network monitoring apparatus 20 can issue an alert by using a method for sending a notification packet or e-mail, etc. to the management server, the node 90, or a previously established administrator terminal, or the like, or a method for displaying a warning via a display apparatus (display monitor, LED, etc.) which is provided in the network monitoring apparatus 20.

<Example of Correlation Analysis>

Below, an example of a correlation analysis will be described. However, the correlation analysis is not limited to the example indicated in the present embodiment, provided that it is possible to analyze whether or not a plurality of communications performed by a terminal have a correlation from the viewpoint of phase transitions which accompany malware activity.

(1) First Correlation Analysis

The communication pattern determination process (see step S006) is based on previously defined "communication patterns". Therefore, by this process alone, it is not possible to detect malware which is carrying out communications which do not match the communication patterns. Consequently, in the present embodiment, the first correlation analysis (see step S007) is carried out.

Figure 9:
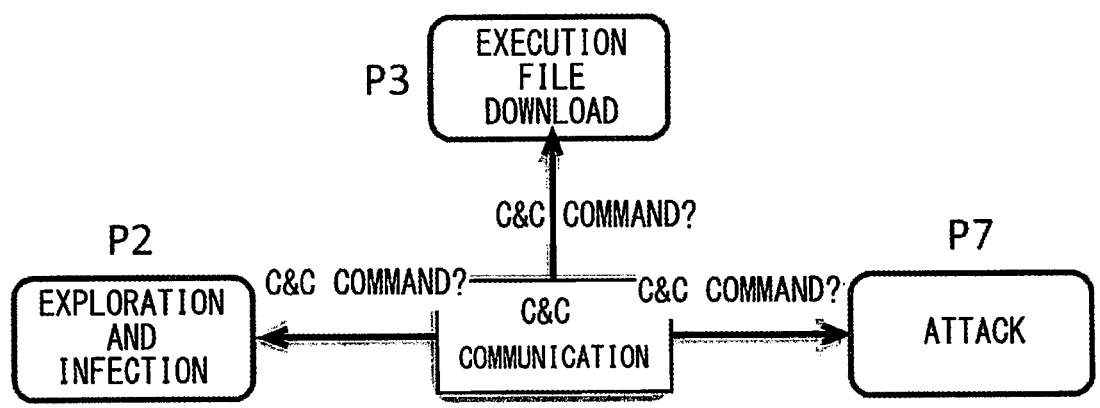
FIG. 9 is a diagram showing phases in an activity transition model and the transitions therebetween, which are objects of monitoring in a first correlation analysis according to the embodiment.

FIG. 9 is a diagram showing the phases in the activity transition model and the transitions therebetween, which are the object of monitoring in the first correlation analysis in the present embodiment. In general, malware transfers to the exploration and infection phase P2, the execution file download phase P3 or the attack activity phase P7, in accordance with a command from the C&C server. Furthermore, the time from receiving the command from the C&C server until transferring to the exploration and infection phase P2, execution file download phase P3 or attack activity phase P7 is generally extremely short (within one second). In the first correlation analysis, these characteristics are utilized, and when the terminal (h) has transferred to the exploration and infection phase P2, execution file download phase P3 or attack activity phase P7, the communication triggering this transfer is regarded provisionally as a C&C communication, and the terminal relating to the communication in question is registered in the C&C server candidate list. After registration in the C&C server candidate list, the processing for identifying malware information is performed in line with the malware detection method described above.

(1.1) Preparation (Gathering Evaluation Information)

In the first correlation analysis, when activity in the exploration and infection phase P2, the execution file download phase P3 or the attack activity phase P7 of the activity transition model is observed (a communication pattern is detected), the communication triggering this activity is analyzed, and if prescribed conditions are satisfied, the transmission source of the communication triggering the activity (the connection destination as viewed from the terminal (h)) is registered in the list as a C&C server candidate. Below, the method of gathering information and the recorded contents used in the first correlation analysis will be described. The processing described below is executed each time a packet sent by a terminal that is the object of monitoring is detected. Furthermore, this preparation (evaluation information gathering) process is carried out after completion of the communication pattern determination process (see step S006).

(1.1.1) Analysis

If the packet is analyzed and the conditions described below are satisfied, then the procedure advances to the packet waiting step in (1.1.2). If these conditions are not satisfied, the procedure waits for a packet, without taking any action.

The packet is any one of an HTTP GET, POST, PUT, or CONNECT request sent by the terminal (h). And The GET request is not a file download request. And The value of the User-Agent header does not start with "Mozilla", or there is no User-Agent header.

The condition relating to the User-Agent described above means that only an HTTP request sent by an application other than a Web browser is the object of evaluation. (Impersonation) Since web browser communications are the object of evaluation in the communication pattern determination process, then only non-web browser communications are the object in the first correlation analysis. If the conditions described above are satisfied, then the following information is recorded in the terminal (h) management table.

Method type (any one of GET, POST, PUT, CONNECT)

User-Agent header value (text string). "NULL" if there is no User-Agent header

Host header value (FQDN or IP address)

(1.1.2) Waiting for Packet

Here, the procedure waits for the subsequent packet. When a packet is received, the following processes are carried out.

If the packet is a new HTTP request sent by a terminal (h) which satisfies the condition (1.1.1), then the processing returns to the analysis in (1.1.1). In the HTTP request and the response, only the time stamp of the latest data is required, but since there is a possibility of packet loss, a time stamp may be recorded every time an HTTP response is received, and the time stamp may be overwritten when a subsequent response is received.

If the packet is a response to an HTTP request sent by the terminal (h) in (1.1.1), and the size of the body part of the HTTP response is zero, then the processing transfers to (1.1.1). This is because if the size of the body part of the HTTP response is zero, then this means that the response does not contain command information from the C&C server.

The packet is a response to an HTTP request sent by the terminal (h) in (1.1.1). Furthermore, if the size of the body part of the HTTP response is not zero, then the contents indicated below are recorded and the processing transfers to (1.1.3).

The detection (reception) time of the HTTP response packet (time stamp: milliseconds) is recorded. Hereinafter, this time stamp is expressed as "TimeStamp(C)". Here, only the time stamp of the latest HTTP response data is required, but since there is a possibility of packet loss, a time stamp is recorded when all HTTP responses are received, and the time stamp is overwritten when a subsequent response is received.

(1.1.3) Determination

Here, the following determination and processing is carried out.

If the packet processed in (1.1.2) is not the final data of an HTTP response, then the malware behavior detection engine 25 halts at (1.1.2) and waits for the subsequent response.

If the packet processed in (1.1.2) is the final data of an HTTP response, then the malware behavior detection engine 25 transfers to the analysis in (1.1.1) and waits for a new HTTP response.

(1.2) Contents of Processing Upon Transfer to Exploration and Infection Phase P2

The malware behavior detection engine 25 carries out the following processing successively, and if the conditions are satisfied, registers the terminal relating to the packet recorded in "Preparation (gathering evaluation information)", in the C&C server candidate list.

Recognize activity in exploration and infection phase P2 (matches "communication pattern of exploration and infection phase P2"), and The time of transfer to the exploration and infection phase P2 (time stamp: TimeStamp(P2)) and the recorded TimeStamp(C) satisfy the following condition.

TimeStamp(C)+500 ms>TimeStamp(P2)

The malware behavior detection engine 25 applies the grade (Gr)=0.3 to a communication (input packet) recorded in "Preparation (Gathering evaluation information)" which satisfies the aforementioned condition. This grade is compared with the recorded grade (PGr) of the C&C communication phase, and the larger of these grades is re-recorded as the grade (PGr) of the C&C communication phase. The TimeStamp(P2) is recorded in the communication pattern determination process, when the "communication pattern of the exploration and infection phase P2" is detected. The TimeStamp(P2) is measured only in respect of communication patterns which correspond to "suspicious connection attempt" in the exploration and infection phase. Furthermore, the observation time of the communication pattern is the time at which a communication pattern corresponding to "suspicious connection attempt" is detected.

(1.3) Contents of Processing Upon Transition to Execution File Download Phase P3

The malware behavior detection engine 25 carries out the following processing successively, and if the conditions are satisfied, registers the terminal relating to the packet recorded in "Preparation (gathering evaluation information)", in the C&C server candidate list.

Recognize activity in execution file download phase P3 (matches "communication pattern of execution file download phase P3"), and The time of transition to execution file download phase P3 (time stamp: TimeStamp(P3)) and the recorded TimeStamp(C) satisfy the following condition.

TimeStamp(C)+500 ms>TimeStamp(P3)

The malware behavior detection engine 25 applies the grade (Gr)=0.3 to a communication recorded in "Preparation (Gathering evaluation information)" which satisfies the aforementioned condition. This grade is compared with the recorded grade (PGr) of the C&C communication phase, and the larger of these grades is re-recorded as the grade (PGr) of the C&C communication phase. The TimeStamp(P3) is recorded in the communication pattern determination process, when the "communication pattern of the execution file download phase P3" is detected. The TimeStamp(P3) is not the time of the start of the HTTP GET request, FTP download or TFTP download, but rather the time at which file download is completed (or the time of the last packet response in the case of HTTP GET). Since packet loss occurs, TimeStamp (P3) may be updated each time an individual packet of an HTTP GET response or an FTP/TFTP download packet is detected.

(1.4) Contents of Processing Upon Transition to Attack Phase P7

The malware behavior detection engine 25 carries out the following processing successively, and if the conditions are satisfied, registers the terminal relating to the packet recorded in "Preparation (gathering evaluation information)", in the C&C server candidate list.

Recognized as activity of the attack phase P7 (matches the "communication pattern of attack phase P7"), and The time of transition to attack phase P7 (time stamp: TimeStamp(P7)) and the recorded TimeStamp(C) satisfy the following condition.

TimeStamp(C)+500 ms>TimeStamp(P7)

The malware behavior detection engine 25 applies the grade (Gr)=0.3 to a communication recorded in "Preparation (Gathering evaluation information)" which satisfies the aforementioned condition. This grade is compared with the recorded grade (PGr) of the C&C communication phase, and the larger of these grades is re-recorded as the grade (PGr) of the C&C communication phase. The TimeStamp(P7) is recorded in the communication pattern determination process, when the "communication pattern of the attack phase P7" is detected. The TimeStamp(P7) is not the time at which an attack activity is recognized (ultimately from a plurality of packets), but rather the time at which the first packet of an attack communication pattern is detected.

(2) Second Correlation Analysis

Malware progressively deepens activity as it transfers through the phases of the malware activity transition model. Consequently, if the activity (communication) in the phases immediately after transition has a high possibility of being triggered by the activity (communication) in the phase one before (in other words, if there is a correlation between the phases before and after transition), then it is determined that the terminal in question has a high probability of being infected with malware. A method can be envisaged in which the trigger is determined from the data contents included in the communication pattern (for example, the contents of an instruction from a C&C server), but there are many types of malware which encrypts or obfuscates the data part, and real-time analysis and determination are difficult to achieve. Therefore, in the present embodiment, the second correlation analysis (see step S008) is carried out based on the time required to transfer phase (the time from detecting the communication pattern Pr-s until detecting the communication pattern Pm-n), the terminal (h) of the communication destination (call-back communication), the correlation and degree of match between the behavior of a plurality of terminals having a high possibility of malware infection, and information such as the type of file handled, etc. If, as a result of this analysis, it has been possible to detect that the communication is one having a high suspicion of malware behavior, then the grade Gr(Pm–n) of the communication pattern Pm–n corresponding to this communication is corrected (multiplied by a malware behavior similarity coefficient $\theta$), to assign a higher grade.

Below, the details of the analysis performed in communication pattern correlation analysis will be described. If the sequence of transitions between phases does not match, or if the phase transitions match but a different phase is inserted between, then the pattern is not regarded as an object for analysis, and correlation analysis is not carried out. Furthermore, the malware behavior detection engine 25 does not set all phase transitions as an object for correlation analysis. The malware behavior detection engine 25 sets, as an object for correlation analysis, the following phase transitions in which a marked correlation with malware behavior is observed. From FIG. 10 to FIG. 14, the solid arrows indicate a transition that is an analysis object and the dotted arrows indicate a transition that is not an analysis object.

(2.1) Contents of Analysis Upon Transition to Exploration and Infection Phase P2

Figure 10:
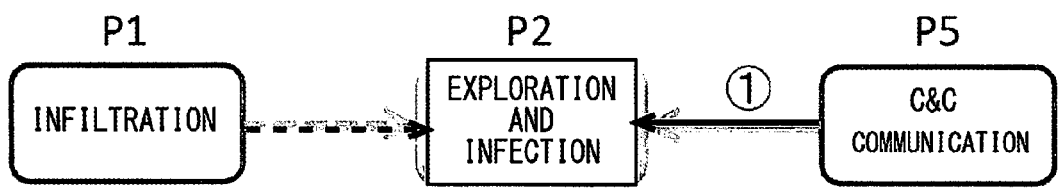
FIG. 10 is a diagram showing a transition to an exploration and infection phase, which is an object of monitoring in a second correlation analysis according to the embodiment.

FIG. 10 is a diagram showing a transition to an exploration and infection phase P2, which is the object of monitoring in the second correlation analysis in the present embodiment. The malware behavior detection engine 25 carries out the following analysis if the terminal (h) has transferred to the exploration and infection phase P2 in the "malware activity phase determination" processing block, and if applicable, corrects the grade for the communication pattern.

(2.1.1) Transition from C&C Communication Phase P5 to Exploration and Infection Phase P2 if {condition A=TRUE} then {Gr(h, P2–m)=$\theta$·Gr(h, P2–m)} ($\theta$=1.2)

Condition A: A data communication is observed in any of the C&C servers registered in the C&C server candidate list of the terminal (h) (reception of data (a command) of any kind from a C&C server), and the communication pattern P2–m of the exploration and infection phase is then observed in the terminal (h) within N(a) seconds.

Here, the time of receiving the data (command) from the C&C server is taken to be the time at which the following packets are observed.

If the C&C is an HTTP type, then the reception time of the (final) data of the HTTP response not having zero data length (body part size) which corresponds to an HTTP GET/POST/PUT request If the C&C is HTTPS (direct or CONNECT) or an independent protocol type, then the reception time of the (final) TCP data which does not have a data length of zero, corresponding to the data packet sent by the terminal (h), on the TCP connection If the C&C is an IRC type, then the reception time of the final data of the IRC message which does not have a data length of zero, from the C&C server Here, the communication pattern P2–m of the exploration and infection phase is only applied to a communication pattern which corresponds to a "suspicious connection attempt". Furthermore, the observation time of the communication pattern is the time at which a communication pattern corresponding to "suspicious connection attempt" is detected.

(2.2) Contents of Analysis Upon Transition to Execution File Download Phase P3

Figure 11:
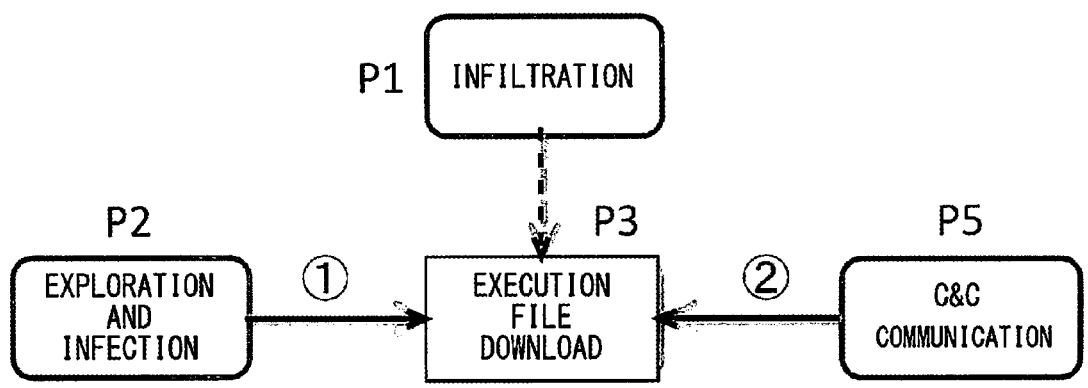
FIG. 11 is a diagram showing a transition to an execution file download phase, which is an object of monitoring in the second correlation analysis according to the embodiment.

FIG. 11 is a diagram showing a transition to the execution file download phase P3, which is the object of monitoring in the second correlation analysis in the present embodiment. The malware behavior detection engine 25 carries out the following analysis if the terminal (h) has transferred to the execution file download phase P3 in the "malware activity phase determination" processing block, and if applicable, corrects the grade for the communication pattern.

(2.2.1) Transition from Exploration and Infection Phase P2 to Execution File Download Phase P3 if {condition A=TRUE} then {Gr(h, P3–m)=$\theta$·Gr(h, P3–m)} ($\theta$=1.5)

if {condition B=TRUE} then {Gr(h, P3–m)=$\theta$·Gr(h, P3–m)} ($\theta$=1.2)

Condition A: The execution file download communication pattern P3–m is observed in the terminal (h), and the connection destination of P3–m (destination IP/FQDN) matches an infecting terminal (k).

Condition B: The execution file download communication pattern P3–m is observed in the terminal (h), and the connection destination of P3–m (destination IP/FQDN) matches any one of the servers registered in the malware delivery server candidate list.

Since the download of an execution file is not always carried out within a prescribed time after malware infection (download may occur 10 seconds after, or 3 days after, for instance), then a time-related condition is not applied in the transition from phase P2 to phase P3.

(2.2.2) Transition from C&C Communication Phase P5 to Execution File Download Phase P3 if {condition C=TRUE} then {Gr(h, P3–m)=$\theta$·Gr(h, P3–m)} ($\theta$=1.2)

if {condition D=TRUE} then {Gr(h, P3–m)=$\theta$·Gr(h, P3–m)} ($\theta$=1.5)

Condition C: A data communication is observed in any of the C&C servers registered in the C&C server candidate list of the terminal (h) (reception of data of any kind from a C&C server), and the communication pattern P3–m of the execution file download phase is then observed in the terminal (h) within N(b) seconds.

Condition D: Condition C, and the connection destination (destination IP/FQDN) of P3–m matches any one of the servers registered in the malware delivery server candidate list.

For the time at which data (a command) is received from the C&C server, see "(2.1) Contents of analysis upon transition to exploration and infection phase P2". The observation time of the communication pattern P3–m of the execution file download phase is not the time of the start of the HTTP GET request, FTP download or TFTP download, but rather the time at which file download is completed (or the time of the last packet response in the case of HTTP GET). Since packet loss occurs, the time may be updated each time an individual packet of an HTTP GET response or an FTP/TFTP download packet is detected.

(2.3) Contents of Analysis Upon Transition to C&C Exploration Phase P4

Figure 12:
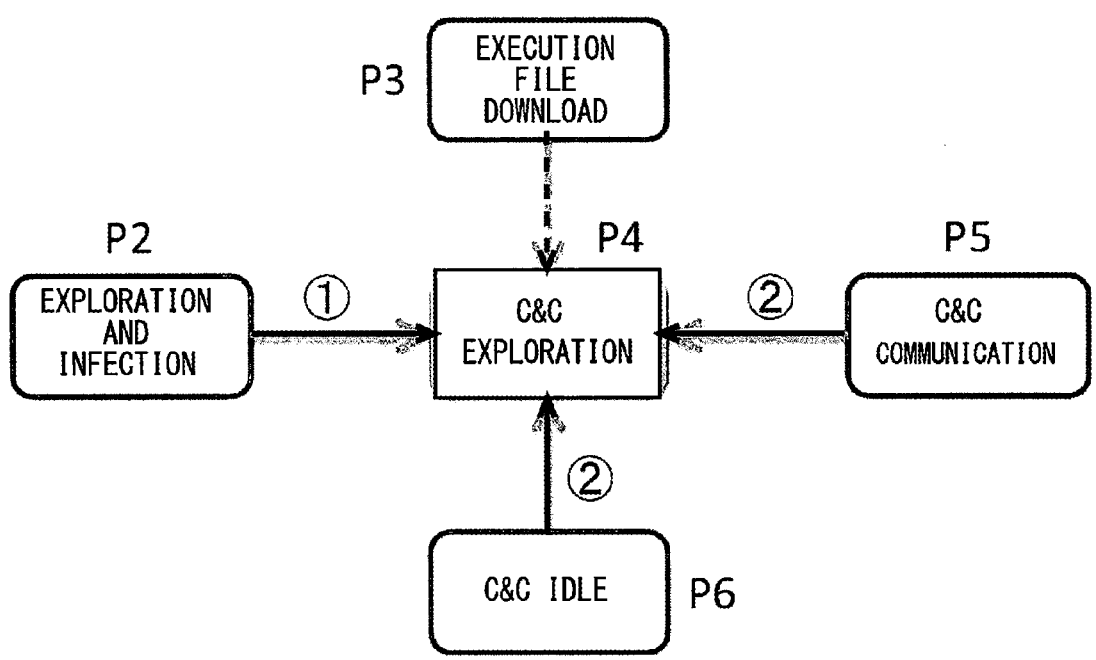
FIG. 12 is a diagram showing a transition to a C&C exploration phase, which is an object of monitoring in the second correlation analysis according to the embodiment.

FIG. 12 is a diagram showing a transition to the C&C exploration phase P4, which is the object of monitoring in the second correlation analysis according to the present embodiment. The malware behavior detection engine 25 carries out the following analysis if the terminal (h) has transferred to the C&C exploration phase P4 in the "malware activity phase determination" processing block, and if applicable, corrects the grade for the communication pattern.

(2.3.1) Transition from Exploration and Infection Phase P2 to C&C Exploration Phase P4 if {condition A=TRUE} then {Gr(h, P4-m)=θ·Gr(h, P4-m)} (θ=1.2)

Condition A: Infection activity is observed in the terminal (h) on the (infected side) (in the connection destination terminal in the communication pattern P2-9 or P2-10), and the communication pattern P4-m of the C&C exploration phase is then observed in the terminal (h) within N(c) seconds.

(2.3.2) Transition from C&C Communication Phase P5 or C&C Idle Phase P6 to C&C Exploration Phase P4 if {condition B=TRUE} then {Gr(h, P4-m)θ·Gr(h, P4-m)} (θ=1.3)

Condition B: The terminal (h) repeats transition from the C&C communication phase P5 or the C&C idle phase P6 to the C&C exploration phase P4 (the communication pattern P4-m of the C&C exploration phase P4 is detected) at a uniform cycle (time interval).

In the present embodiment, if the past three transitions have occurred at substantially the same cycle (time interval), then it is determined that transfer to the C&C exploration phase P4 has been repeated at a uniform cycle.

(2.4) Contents of Analysis Upon Transition to C&C Communication Phase P5

Figure 13:
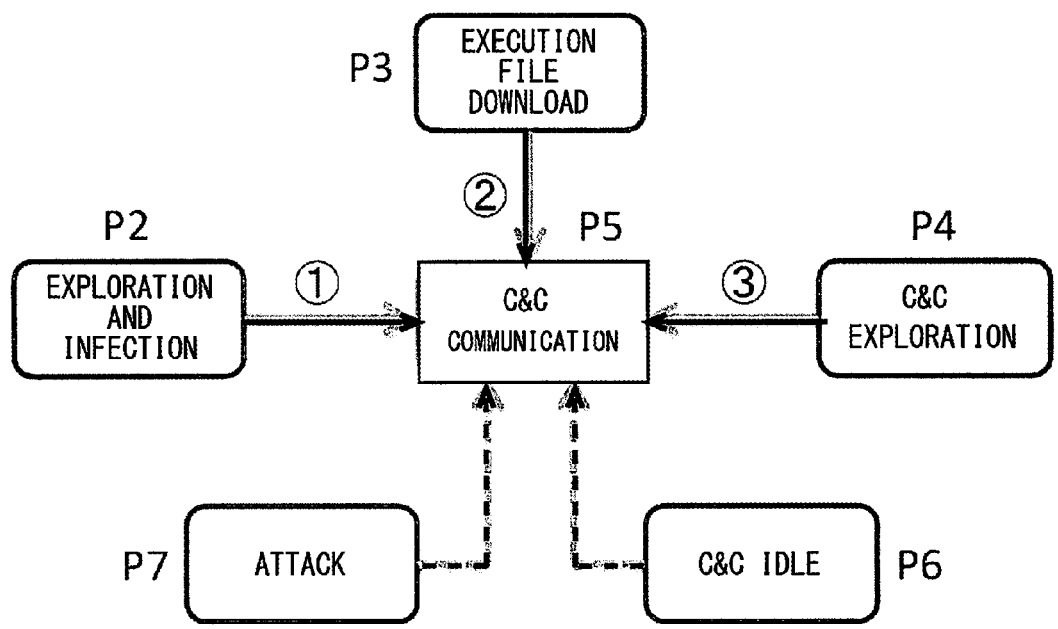
FIG. 13 is a diagram showing a transition to a C&C communication phase, which is an object of monitoring in the second correlation analysis according to the embodiment.

FIG. 13 is a diagram showing a transition to the C&C communication phase P5, which is the object of monitoring in the second correlation analysis in the present embodiment. The malware behavior detection engine 25 carries out the following analysis if the terminal (h) has transferred to the C&C communication phase P5 in the "malware activity phase determination" processing block, and if applicable, corrects the grade for the communication pattern.

(2.4.1) Transition from Exploration and Infection Phase P2 to C&C Communication Phase P5 if {condition A=TRUE} then {Gr(h, P5-m)=θ·Gr(h, P5-m)} (θ=1.1)

if {condition B=TRUE} then {Gr(h, P5-m)=θ·Gr(h, P5-m)} (θ=1.2)

if {condition C=TRUE} then {Gr(h, P5-m)=θ·Gr(h, P5-m)} (θ=1.5)

Condition A: Infection activity is observed in the terminal (h) (in the infected terminal in the communication pattern P2-9 or P2-10), and the communication pattern P5-m of the C&C communication phase P5 is then observed in the terminal within N(d) seconds.

Condition B: Condition A, and the connection destination (destination IP/FQDN) of P5-m matches any one of the C&C servers registered in the C&C server candidate list (of any terminal that is the object of monitoring).

Condition C: Condition A, and the connection destination (destination IP/FQDN) of P5-m matches any one of the C&C servers registered in the C&C server candidate list of an infecting terminal (k).

(2.4.2) Transition from Execution File Download Phase P3 to C&C Communication Phase P5 if {condition D=TRUE} then {Gr(h, P5-m)=θ·Gr(h, P5-m)} (θ=1.1)

if {condition E=TRUE} then {Gr(h, P5-m)=θ·Gr(h, P5-m)} (θ=1.2)

if {condition F=TRUE} then {Gr(h, P5-m)=θ·Gr(h, P5-m)} (θ=1.3)

Condition D: An execution file download communication pattern P3-m is observed in the terminal (h), and the communication pattern P5-m of the C&C communication phase is then observed in the terminal (h) within N(e) seconds.

Condition E: Condition D, and the connection destination (destination IP/FQDN) of P5-m matches any one of the C&C servers registered in the C&C server candidate list (of any terminal that is the object of monitoring).

Condition F: Condition D, and the connection destination (destination IP/FQDN) of P5-m matches any one of the C&C servers already registered in the C&C server candidate list of the terminal (h).

(2.4.3) Transition from C&C Communication Phase P4 to C&C Communication Phase P5 if {condition G=TRUE} then {Gr(h, P5-m)=θ·Gr(h, P5-m)} (θ=1.2)

Condition G: If the communication pattern P4-m of the C&C exploration phase is observed in the terminal (h), and within N(f) seconds, the communication pattern P5-m of the C&C communication phase is observed in the terminal (h), and the connection destination (destination IP/FQDN) in P5-m is any one of the C&C servers registered in the C&C server candidate list (or any of the terminals that are the object of monitoring).

(2.5) Contents of Analysis Upon Transition to Attack Phase P7

Figure 14:
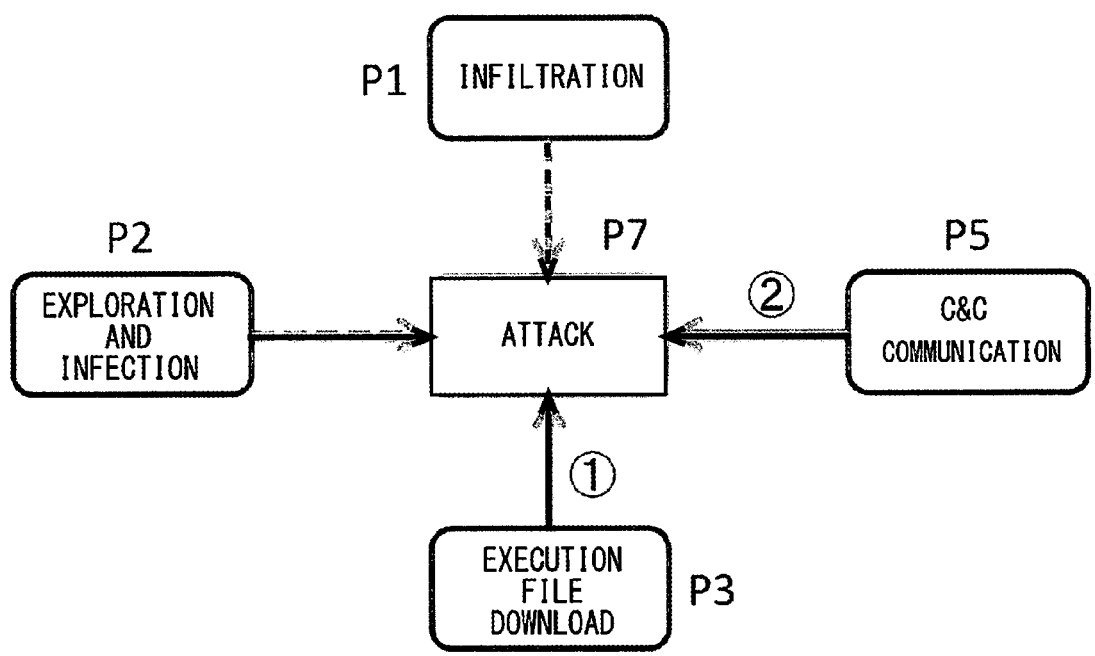
FIG. 14 is a diagram showing a transition to an attack phase, which is an object of monitoring in the second correlation analysis according to the embodiment.

FIG. 14 is a diagram showing a transition to an attack phase P7, which is the object of monitoring in the second correlation analysis in the present embodiment. The malware behavior detection engine 25 carries out the following analysis if the terminal (h) has transferred to the C&C communication phase P5 in the "malware activity phase determination" processing block, and if applicable, corrects the grade for the communication pattern.

(2.5.1) Transition from Execution File Download Phase P3 to Attack Phase P7 if {condition A=TRUE} then {Gr(h, P7-m)=θ·Gr(h, P7-m)} (θ=1.2)

Condition A: The execution file download communication pattern P3-m is observed in the terminal (h), and the attack phase communication pattern P7-m is then observed in the terminal (h) within N(g) seconds.

(2.5.2) Transition from C&C Communication Phase P5 to Attack Phase P7 if {condition B=TRUE} then {Gr(h, P7-m)=θ·Gr(h, P7-m)} (θ=1.2)

if {condition C=TRUE} then {Gr(h, P7-m)=θ·Gr(h, P7-m)} (θ=1.5)

Condition B: A data communication is observed in any of the C&C servers registered in the C&C server candidate list of the terminal (h) (reception of data (a command) of any kind from a C&C server), and the attack phase communication pattern P7-m is then observed in the terminal (h) within N(h) seconds.

Condition C: Two or more terminals satisfying condition B are detected (the detection does not have to occur simultaneously).

<Variations>

In the embodiment described above, an example is given in which the network monitoring apparatus 20 operates in a passive mode of acquiring packets or frames, etc. which are sent and received by a node 90, by being connected to a monitoring port (mirror port) of a switch or router, and the network monitoring apparatus 20 does not transfer the acquired packets (see FIG. 1). However, the network configuration illustrated in the embodiment given above is one example of implementing the present disclosure, and other network configuration may be employed in implementing the disclosure.

Figure 15:
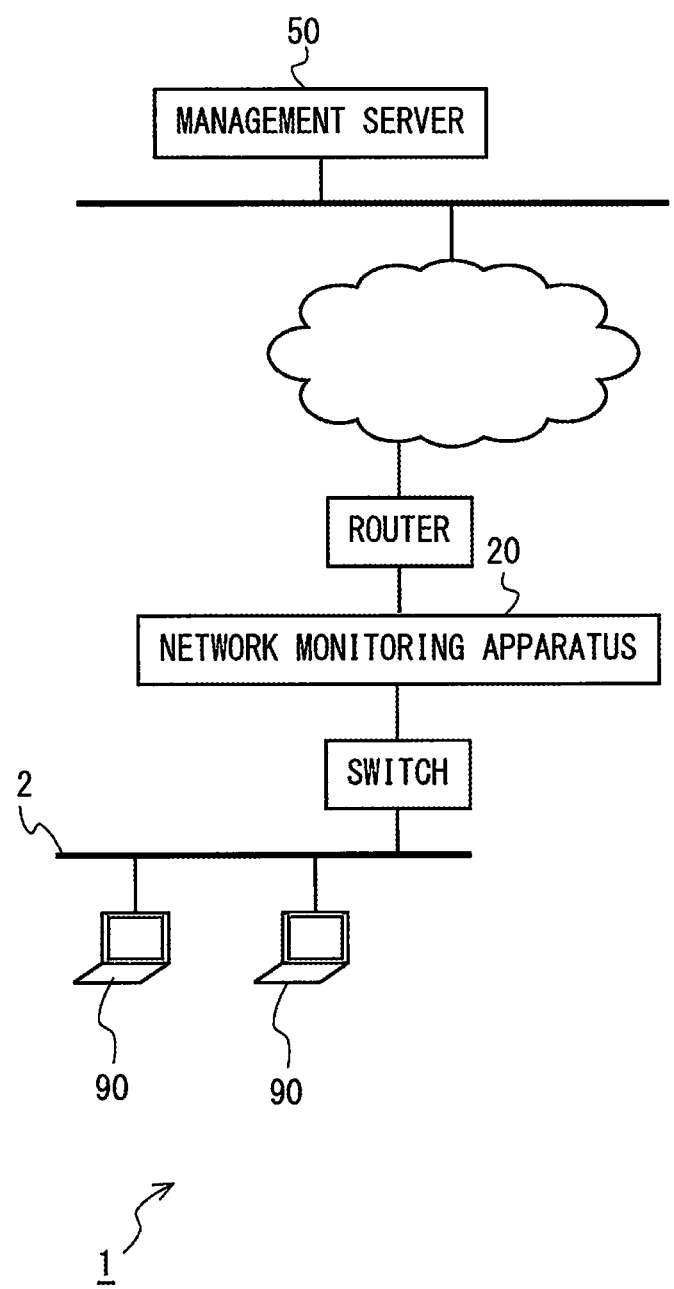
FIG. 15 is a schematic drawing showing a variation of the configuration of a system relating to the embodiment.

For example, even in a case where the network monitoring apparatus 20 is not connected to the monitoring port (mirror port), and is simply connected to a network segment 2, it is possible to acquire the packets and frames, etc. sent and received by the node 90, by acquiring all of the frames flowing through the network segment 2, including those which are not directed to the MAC address of the network monitoring apparatus 20. In this case also, the network monitoring apparatus 20 operates in passive mode. Furthermore, for example, the network monitoring apparatus 20 may acquire passing packets and frames, etc., by being connected between the switch or router of the network segment 2 and another switch or router at a higher level (see FIG. 15). In this case, the network monitoring apparatus 20 operates in an in-line mode where it transfers those acquired packets which do not need to be blocked. Furthermore, the network monitoring apparatus 20 may also be incorporated into the router or switch.

What is claimed is:

1. An information processing apparatus, comprising:
 a processor configured with:
  a comparison unit that compares a communication by a terminal connected to a network with a pattern held in advance;
  a specification unit that specifies an evaluated value indicating a degree to which it is inferred that the terminal is used to conduct unauthorized activity, and a phase indicating a transitional state of unauthorized activity in the terminal from among plural phases of unauthorized activity, in accordance with a comparison result of comparison by the comparison unit;
  a determination unit that determines whether or not the terminal is used to conduct unauthorized activity, based on a maximum value of the evaluated value for each of the phases;
  an evaluation value acquisition unit that acquires, as the evaluated value, a value pre-established in respect of a pattern which is matching or similar to the communication, as the comparison result; and
  a correction unit that corrects the acquired evaluated values, wherein the specification unit specifies the value corrected by the correction unit, as the evaluated value; and
 a memory that holds the maximum value of the evaluated value, for each of the phases, and for each terminal.

2. The information processing apparatus according to claim 1, wherein the specification unit specifies, as the phase relating to the communication, a phase pre-established in respect of a pattern which is matching or similar to the communication as the comparison result.

3. The information processing apparatus according to claim 2, wherein the evaluation value acquisition unit acquires the evaluated value in accordance with a result of a correlation analysis between the communication and other communication carried out before or after the communication by the terminal.

4. The information processing apparatus according to claim 3, wherein the evaluation value acquisition unit acquires the evaluated value when determination is made, by the correlation analysis, that there is continuity between the phase acquired in relation to the communication and a phase acquired in relation to other communication carried out before or after the communication in relation to the terminal.

5. The information processing apparatus according to claim 2, wherein the correction unit corrects the evaluated value in accordance with a result of a correlation analysis between the communication and other communication carried out before or after the communication by the terminal.

6. The information processing apparatus according to claim 5, wherein the correction unit corrects the evaluated value so as to be larger, when determination is made by the correlation analysis that there is continuity between the phase acquired in relation to the communication and a phase acquired in relation to other communication carried out before or after the communication in relation to the terminal, compared to when determination is made that there is no such continuity.

7. The information processing apparatus according to claim 1, further comprising a totalizing unit that totalizes maximum values of the evaluated values for each of the phases, and for each terminal, wherein
 the determination unit determines whether or not the terminal is used to conduct unauthorized activity based on a total value obtained by the totalizing unit.

8. The information processing apparatus according to claim 7, wherein the determination unit determines that the terminal is used to conduct unauthorized activity, when the total value or a value based on the total value exceeds a prescribed threshold value.

9. The information processing apparatus according to claim 7, wherein the determination unit determines that the terminal is used to conduct unauthorized activity, when a value obtained by applying a prescribed weighting to the total value exceeds a prescribed threshold value.

10. The information processing apparatus according to claim 1, further comprising a communication acquisition unit that acquires a communication by a terminal connected to the network, wherein the comparison unit compares the acquired communication with a pattern held in advance.

11. The information processing apparatus according to claim 1, further comprising a communication blocking unit that blocks a communication by the terminal when determination is made that the terminal is used to conduct unauthorized activity.

12. The information processing apparatus according to claim 1, further comprising one or a plurality of detection units that detect unauthorized communication by a terminal connected to a network, wherein the determination unit determines whether or not the terminal is used to conduct unauthorized activity based on a communication that has not been detected as an unauthorized communication by the detection unit.

13. A method for determining unauthorized activity, to be executed by a computer, comprising the steps of:
 comparing a communication by a terminal connected to a network with a pattern held in advance;
 specifying an evaluated value indicating a degree to which it is inferred that the terminal is used to conduct unauthorized activity, and a phase indicating a transitional state of unauthorized activity in the terminal from among plural phases of unauthorized activity, in accordance with a comparison result of the comparing;
 holding a maximum value of the evaluated value, for each of the phases, and for each terminal;
 determining whether or not the terminal is used to conduct unauthorized activity, based on the maximum value of the evaluated value for each of the phases;
 acquiring, as the evaluated value, a value pre-established in respect of a pattern which is matching or similar to the communication, as the comparison result; and
 correcting the acquired evaluated values, wherein the specifying step specifies the value corrected, as the evaluated value.

14. A non-transitory computer-readable medium on which is recorded a program for determining unauthorized activity, the program causing a computer to:
 compare a communication by a terminal connected to a network with a pattern held in advance;

specify an evaluated value indicating a degree to which it is inferred that the terminal is used to conduct unauthorized activity, and a phase indicating a transitional state of unauthorized activity in the terminal from among plural phases of unauthorized activity, in accordance with a comparison result of the comparison;

hold a maximum value of the evaluated value, for each of the phases, and for each terminal;

determine whether or not the terminal is used to conduct unauthorized activity, based on the maximum value of the evaluated value for each of the phases;

acquire, as the evaluated value, a value pre-established in respect of a pattern which is matching or similar to the communication, as the comparison result; and correct the acquired evaluated values, wherein the specifying specifies the value corrected, as the evaluated value.

* * * * *